US012463362B2

(12) United States Patent
Shimomura et al.

(10) Patent No.: US 12,463,362 B2
(45) Date of Patent: Nov. 4, 2025

(54) CONNECTOR ASSEMBLY

(71) Applicant: Panasonic Intellectual Property Management Co., Ltd., Osaka (JP)

(72) Inventors: Ryosuke Shimomura, Mie (JP); Hiroshi Tanaka, Aichi (JP); Kazumasa Iijima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 269 days.

(21) Appl. No.: 18/264,268

(22) PCT Filed: Mar. 2, 2022

(86) PCT No.: PCT/JP2022/008836
§ 371 (c)(1),
(2) Date: Aug. 4, 2023

(87) PCT Pub. No.: WO2022/190987
PCT Pub. Date: Sep. 15, 2022

(65) Prior Publication Data
US 2024/0097366 A1 Mar. 21, 2024

(30) Foreign Application Priority Data
Mar. 8, 2021 (JP) ................................. 2021-036771

(51) Int. Cl.
*H01R 12/73* (2011.01)
*H01R 13/6581* (2011.01)

(52) U.S. Cl.
CPC ......... *H01R 12/73* (2013.01); *H01R 13/6581* (2013.01)

(58) Field of Classification Search
CPC ............................ H01R 12/73; H01R 13/6581
(Continued)

(56) References Cited

U.S. PATENT DOCUMENTS 7,168,986 B1 * 1/2007 Peng .................... H01R 12/716 439/607.04
8,292,630 B1 * 10/2012 Bobuk .................. H01R 12/73 439/74
(Continued)

FOREIGN PATENT DOCUMENTS

CN 106935995 A * 7/2017 ............. H01R 24/00
JP 2015050132 A * 3/2015 ........... H01R 12/716
(Continued)

OTHER PUBLICATIONS

International Search Report of PCT application No. PCT/JP2022/008836 dated Apr. 26, 2022.

*Primary Examiner* — Peter G Leigh
(74) *Attorney, Agent, or Firm* — Rimon P.C.

(57) ABSTRACT

An object of the present disclosure is to reduce noise caused by a return current. Connector assembly includes first connector and second connector to which first connector is fitted from above. First connector includes first shield and first specific terminal. Second connector includes second specific terminal. First shield has first opposed portion facing first specific terminal on second axis in the fitted state. The first specific terminal includes first terminal proximity portion in which a distance to first opposed portion on second axis is smaller than a distance between the second specific terminal and the first opposed portion on second axis in the fitted state. A projected area obtained by projecting the first wide face onto virtual plane orthogonal to second axis is greater than a projected area obtained by projecting the first narrow face onto the virtual plane.

14 Claims, 21 Drawing Sheets

(58) Field of Classification Search
USPC ........................................................ 439/65
See application file for complete search history.

(56) References Cited

U.S. PATENT DOCUMENTS

| | | | | |
|---|---|---|---|---|
| 8,475,184 | B2 * | 7/2013 | Hasegawa ............ | H01R 13/112<br>439/345 |
| 2013/0012039 | A1 * | 1/2013 | Nose ...................... | H01R 12/73<br>439/74 |
| 2020/0244011 | A1 * | 7/2020 | Kitazawa ........... | H01R 13/6585 |
| 2021/0175649 | A1 | 6/2021 | Amemori et al. | |

FOREIGN PATENT DOCUMENTS

| | | | | | |
|---|---|---|---|---|---|
| JP | 6199666 | B2 | * | 9/2017 | ........... H01R 13/631 |
| JP | 2020-102462 | | | 7/2020 | |
| JP | 2020107472 | A | * | 7/2020 | ......... H01R 13/6585 |
| JP | 2020123438 | A | * | 8/2020 | ......... H01R 13/6581 |
| JP | 2020205236 | A | * | 12/2020 | ............. H01R 12/73 |
| WO | WO-2018049686 | A1 | * | 3/2018 | ........... H01R 12/716 |
| WO | WO-2020168273 | A1 | * | 8/2020 | ............. H01R 12/73 |
| WO | WO-2021020533 | A1 | * | 2/2021 | ............. H01R 12/71 |

* cited by examiner

CONNECTOR ASSEMBLY

CROSS-REFERENCE TO RELATED APPLICATIONS

This application is a U.S. national stage application of the PCT International Application No. PCT/JP2022/008836 filed on Mar. 2, 2022, which claims the benefit of foreign priority of Japanese patent application No. 2021-036771 filed on Mar. 8, 2021, the contents all of which are incorporated herein by reference.

TECHNICAL FIELD

The present disclosure relates generally to a connector assembly. The present disclosure more particularly relates to a connector assembly provided with a first connector and a second connector to which the first connector is fitted.

BACKGROUND ART

PTL 1 discloses an electric connector set. The electric connector set includes a first connector and a second connector. The first connector includes a first connection terminal, a first high frequency connection terminal having a first mounting portion and transmitting a high frequency signal, and a first external grounding member surrounding the first high frequency connection terminal. The second connector includes a second connection terminal, a second high frequency connection terminal having a second mounting portion, and a second external grounding member surrounding the second high frequency connection terminal. When fitted, the second external grounding member is positioned inside the first external grounding member, the first connection terminal and the second connection terminal are positioned outside the first external grounding member, and the second external grounding member is circumferentially closed so as to surround the outer shape of the first high frequency connection terminal and the outer shape of the second high frequency connection terminal when viewed from the insertion/removal direction.

CITATION LIST

Patent Literature

PTL 1: Unexamined Japanese Patent Publication No. 2020-102462

SUMMARY OF THE INVENTION

An object of the present disclosure is to reduce noise caused by a return current.

A connector assembly of one aspect of the present disclosure includes a first connector and a second connector to which the first connector is fitted from above. The first connector includes a plurality of first terminals, a first shield having a first ground connection portion connected to a ground pattern of a first circuit board, and a first housing that holds the plurality of first terminals and the first shield. The second connector includes a plurality of second terminals each coming into contact with a corresponding one of the plurality of first terminals in a fitted state in which the first connector and the second connector are fitted to each other, a second shield having a second ground connection portion connected to a ground pattern of a second circuit board, and a second housing that holds the plurality of second terminals and the second shield. The plurality of first terminals include a first specific terminal. The plurality of second terminals include a second specific terminal. In the fitted state, the first specific terminal is in contact with and electrically connected to the second specific terminal. The first shield has a first opposed portion opposed to the first specific terminal on a second axis orthogonal to the first axis in the fitted state. The first specific terminal includes a first terminal proximity portion in which a distance to the first opposed portion on the second axis is smaller than a distance between the second specific terminal and the first opposed portion on the second axis in the fitted state. The first terminal proximity portion has a first wide face intersecting a thickness axis of the first specific terminal and a first narrow face along the thickness axis of the first specific terminal. A projected area obtained by projecting the first wide face onto a virtual plane orthogonal to the second axis is greater than a projected area obtained by projecting the first narrow face onto the virtual plane.

DESCRIPTION OF EMBODIMENT

Hereinafter, a connector assembly according to an embodiment will be described with reference to the drawings. Incidentally, the following exemplary embodiment is merely one of various exemplary embodiments of the present disclosure. Provided that an object of the present disclosure is achieved, the following exemplary embodiment can be modified in various ways according to design and the like. Furthermore, each figure described in the following exemplary embodiments is a schematic view, and each ratio of sizes and thicknesses of components in a figure does not necessarily reflect the actual dimensional ratio.

(1) Overview

Figure 1:
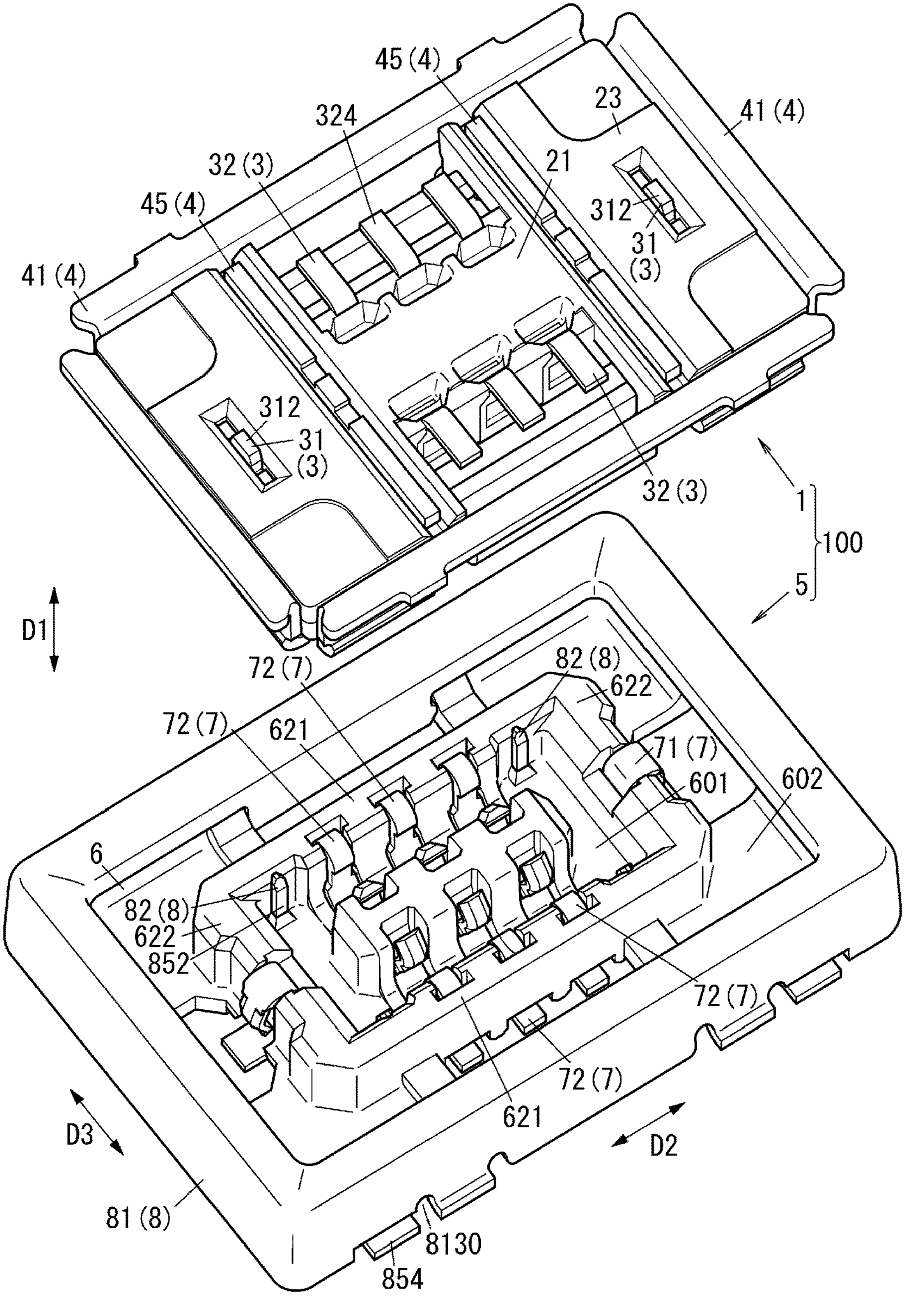
FIG. 1 is an exploded perspective view of a connector assembly according to an embodiment.

As illustrated in FIG. 1, connector assembly 100 of the present embodiment includes first connector 1 and second connector 5. Connector assembly 100 is used to electrically connect a plurality of circuit boards mounted on a portable terminal such as a smartphone. First connector 1 is attached to a first circuit board 91 (see FIGS. 10 to 15) such as a printed wiring board or a flexible printed wiring board. Second connector 5 is attached to a second circuit board 92 (see FIGS. 10 to 15) such as a printed wiring board or a flexible printed wiring board. Note that it is not intended to limit the use of connector assembly 100, and connector assembly 100 may be used for an electronic device other than a portable terminal such as a camera module. In addition, the application of connector assembly 100 is not limited to the application of electrically connecting a plurality of circuit boards, and may be an application of electrically connecting a plurality of components, for example, between a circuit board and a display, between a circuit board and a battery, or the like. In the drawings other than FIGS. 10 to 15, illustration of first circuit board 91 and second circuit board 92 is omitted for convenience.

Figure 2:
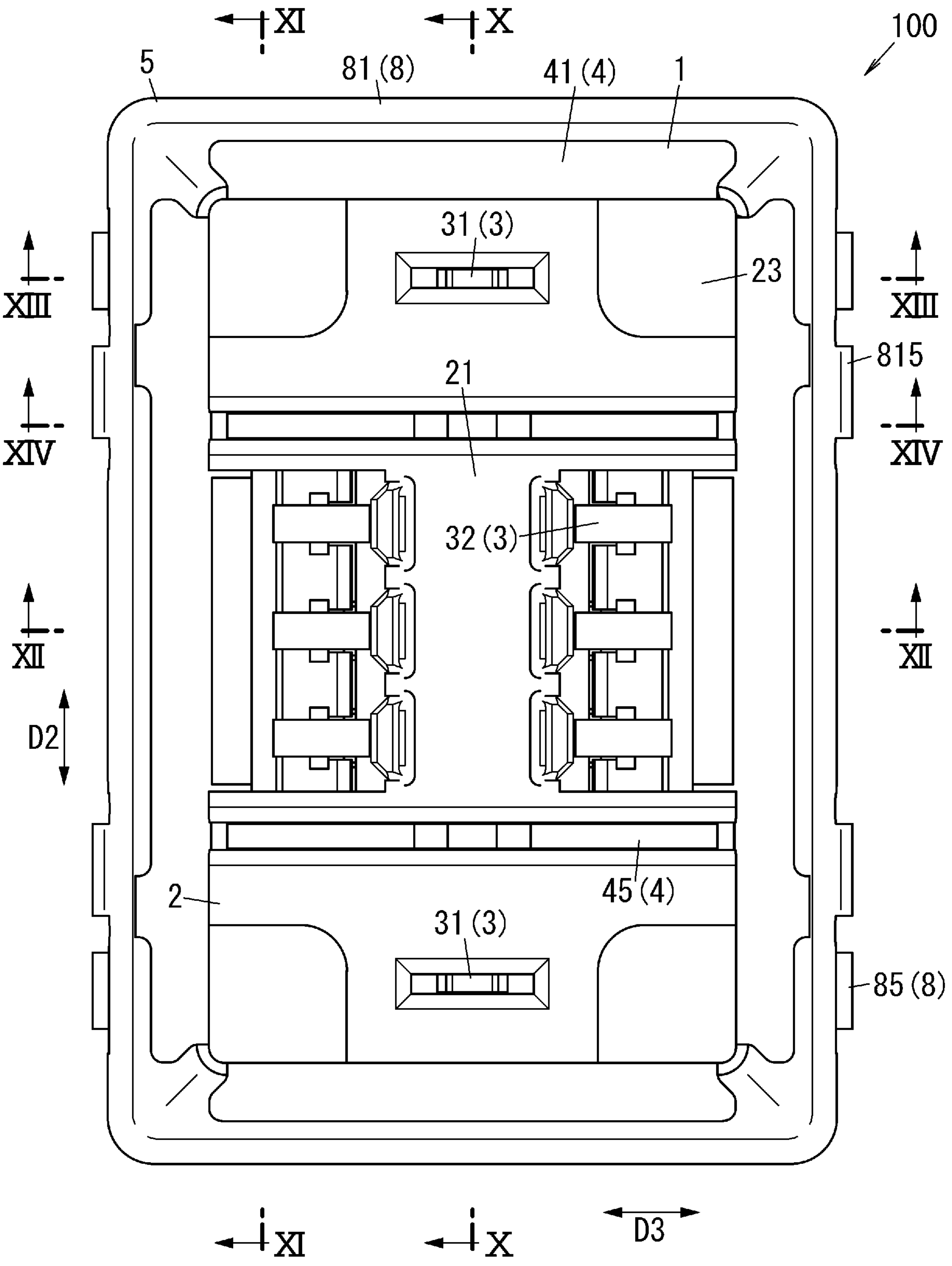
FIG. 2 is a plan view of the connector assembly in a fitted state.

First connector 1 is fitted to second connector 5 along one axis. Hereinafter, an axis on which first connector 1 and second connector 5 are fitted is referred to as a vertical axis, a side on which first connector 1 is positioned is referred to as "upper", and a side on which second connector 5 is positioned is referred to as "lower". That is, first connector 1 is fitted to second connector 5 from above. However, these definitions are not intended to limit the use of connector assembly 100. Hereinafter, a state in which first connector 1 and second connector 5 are fitted to each other (see FIG. 2) is referred to as a "fitted state".

As illustrated in FIGS. 3 to 6, first connector 1 includes first housing 2, a plurality of first terminals 3, and first shield 4. First housing 2 holds the plurality of first terminals 3 and first shield 4. The plurality of first terminals 3 include first specific terminal 31. As illustrated in FIGS. 10 to 15, first shield 4 includes first ground connection portion 405 connected to ground pattern 910 of first circuit board 91. In FIGS. 3 to 6, first connector 1 is illustrated upside down for convenience.

As illustrated in FIGS. 1 and 7 to 9, second connector 5 includes second housing 6, a plurality of second terminals 7, and second shield 8. Second housing 6 holds the plurality of second terminals 7 and second shield 8. The plurality of second terminals 7 are respectively in contact with the plurality of first terminals 3 of first connector 1 in the fitted state. The plurality of second terminals 7 include second specific terminal 71. As illustrated in FIGS. 10 to 15, second shield 8 includes second ground connection portion 803 connected to ground pattern 920 of second circuit board 92.

Figure 10:
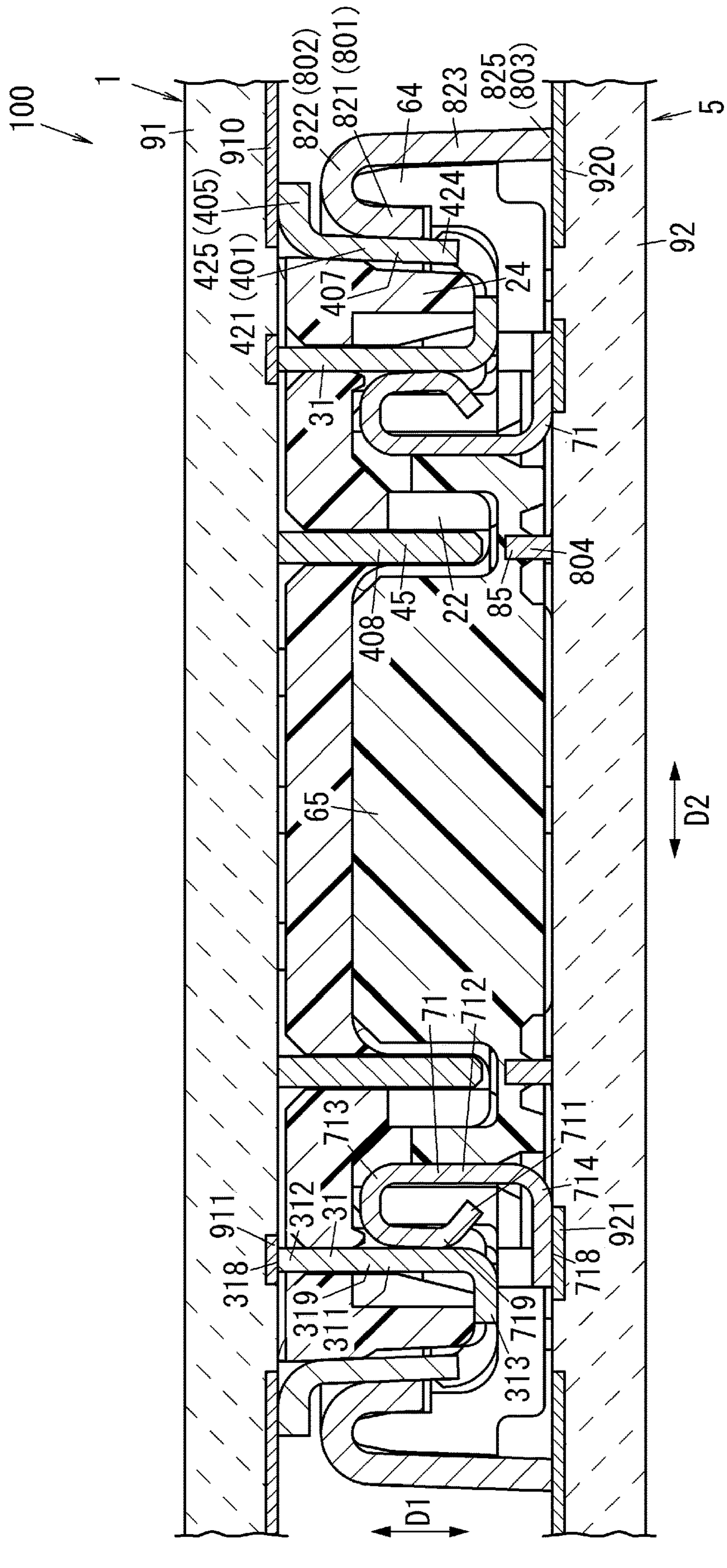
FIG. 10 is a cross-sectional view taken along line X-X of FIG. 2.

As illustrated in FIG. 10, in the fitted state, first specific terminal 31 is in contact with and electrically connected to second specific terminal 71.

Figure 16:
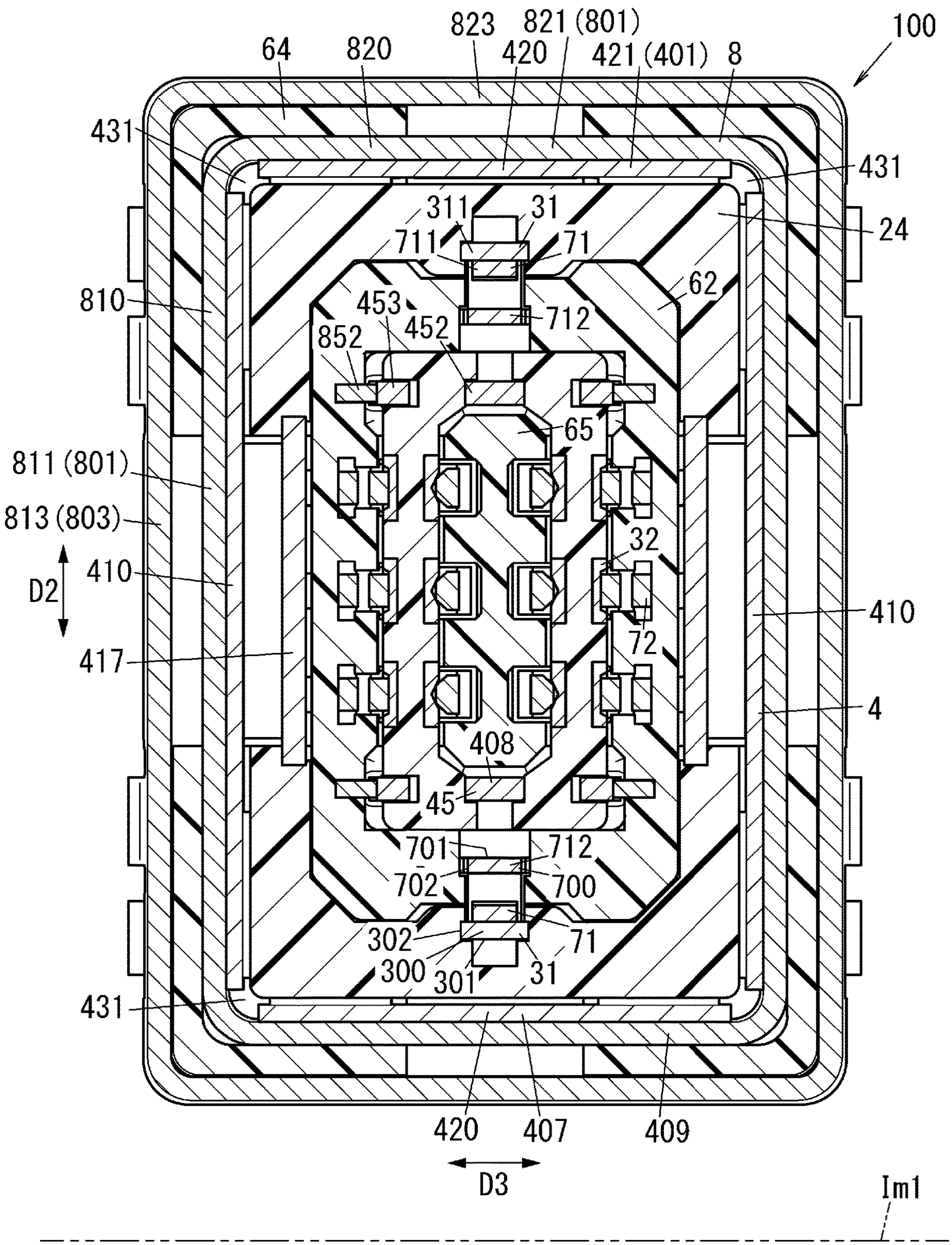
FIG. 16 is a cross-sectional view of the connector assembly in the fitted state.

As illustrated in FIG. 16, first shield 4 has first opposed portion 407 opposed to first specific terminal 31 on second axis D2 orthogonal to first axis D1 in the fitted state. first specific terminal 31 has first terminal proximity portion 300 in which a distance to first opposed portion 407 on second axis D2 is smaller than a distance between second specific terminal 71 and first opposed portion 407 on second axis D2 in the fitted state.

First terminal proximity portion 300 has first wide face 301 intersecting the thickness axis of first specific terminal 31 and first narrow face 302 along the thickness axis of first specific terminal 31. A projected area obtained by projecting first wide face 301 onto virtual plane Im1 orthogonal to second axis D2 is greater than a projected area obtained by projecting first narrow face 302 onto virtual plane Im1.

In connector assembly 100 of the present embodiment, noise caused by the return current can be reduced.

(2) Details

Hereinafter, connector assembly 100 of the present embodiment will be described in more detail with reference to the drawings.

As described above, connector assembly 100 includes first connector 1 and second connector 5. In a state where second connector 5 is positioned relatively downward, first connector 1 is fitted to second connector 5 from above.

Hereinafter, for convenience of description, an axis (vertical axis) along which first connector 1 and second connector 5 are fitted is also referred to as "first axis D1", an axis orthogonal to the vertical axis (first axis D1) and along the longitudinal axis of connector assembly 100 is also referred to as a "second axis D2", and an axis orthogonal to both first axis D1 and second axis D2 is also referred to as a "third axis D3".

(2.1) First Connector

First connector 1 is a header (male connector), and includes first housing 2, a plurality of (in the present embodiment, eight) first terminals 3, and first shield 4 as illustrated in FIGS. 3 to 6.

(2.1.1) First Housing

Figure 4:
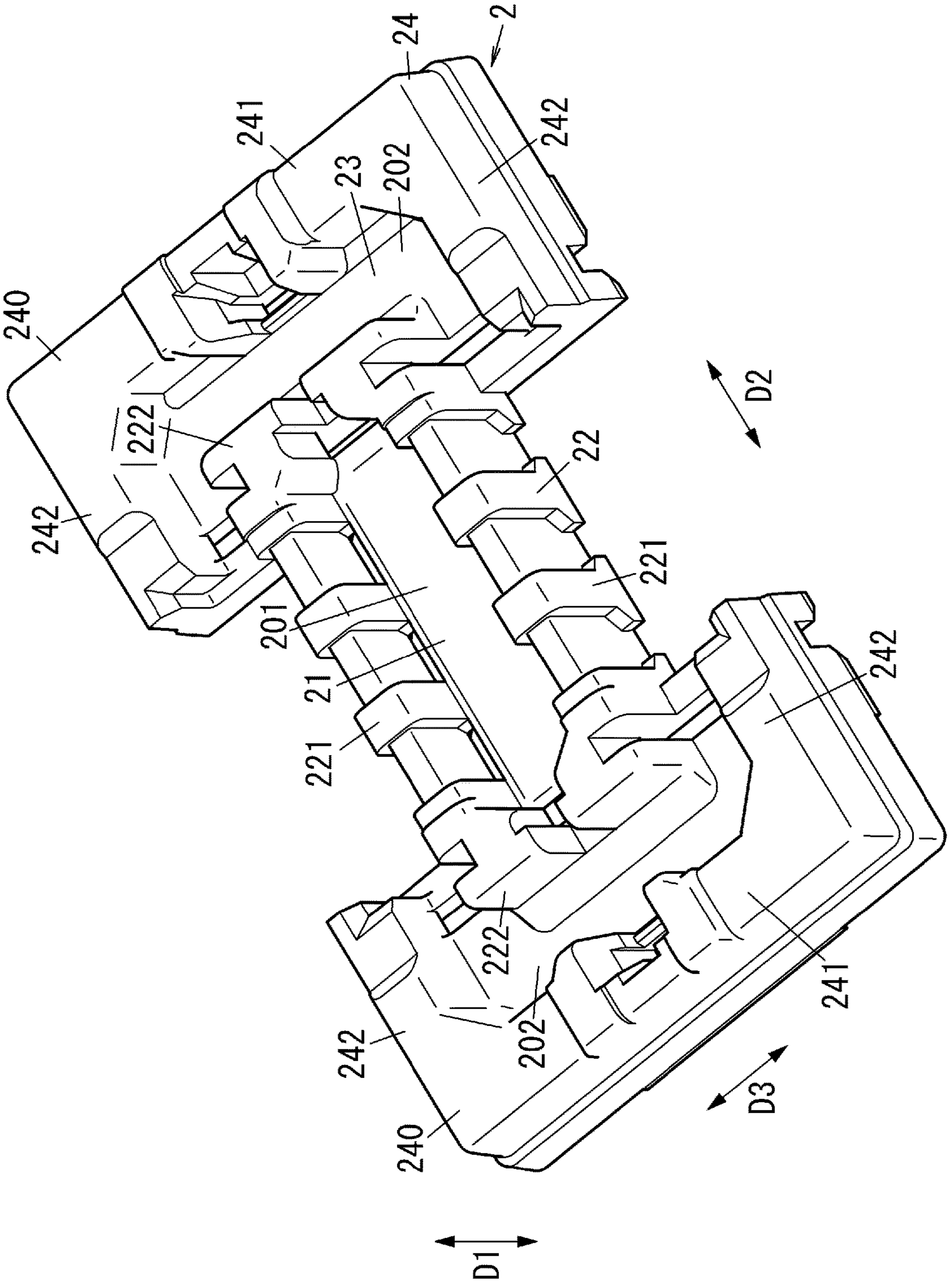
FIG. 4 is a perspective view of a first housing in the first connector.

As illustrated in FIG. 4, first housing 2 is made of an insulating resin material and is formed in a flat shape that is elongated in second axis D2. In first housing 2, both sides of third axis D3 in the central portion of second axis D2 are notched in a substantially rectangular shape as viewed from first axis D1. First housing 2 is formed in a substantially H shape as viewed from first axis D1 (hereinafter, also referred to as "plan view").

As illustrated in FIG. 4, first housing 2 includes first inner bottom wall 21, first inner peripheral wall 22, first outer bottom wall 23, and first outer peripheral wall 24. First inner bottom wall 21, first inner peripheral wall 22, first outer bottom wall 23, and first outer peripheral wall 24 are integrally formed.

First inner bottom wall 21 has a rectangular plate shape elongated in second axis D2.

First inner peripheral wall 22 protrudes downward (upward in FIG. 4) from the peripheral edge of first inner bottom wall 21 and has a rectangular frame shape in a plan view. Specifically, first inner peripheral wall 22 includes a pair of first horizontal inner walls 221 and a pair of first vertical inner walls 222. The pair of first horizontal inner walls 221 is a pair of walls elongated in second axis D2 in first inner peripheral wall 22. The pair of first vertical inner walls 222 is a pair of walls elongated in third axis D3 in first inner peripheral wall 22. A portion surrounded by the inner bottom face of first inner bottom wall 21 and the inner side face of first inner peripheral wall 22 constitutes first fitting recess 201 to which second connector 5 is fitted. Specifically, base 65 of second connector 5 is fitted into first fitting recess 201.

First outer bottom wall 23 includes two partial bottom walls that extend in a rectangular shape from both ends of second axis D2 of first inner bottom wall 21 toward the outside of second axis D2. First inner bottom wall 21 and first outer bottom wall 23 have a substantially H shape in a plan view.

First outer peripheral wall 24 protrudes downward from the peripheral edge of first outer bottom wall 23 so as to surround first inner peripheral wall 22. First outer peripheral wall 24 has a pair of first outer walls 240 each having a C-shape (square bracket shape) and an inverted C-shape (inverted square bracket shape) in a plan view. Each of the pair of first outer walls 240 has first vertical outer wall 241 and a pair of first horizontal outer walls 242. Of first outer walls 240, first vertical outer wall 241 is long in third axis D3. Of first outer walls 240, the pair of first horizontal outer walls 242 is a pair of walls elongated in second axis D2. The pair of first horizontal outer walls 242 extends along second axis D2 from both ends of third axis D3 of first vertical outer wall 241.

One of the pair of first outer walls 240 surrounds one end of second axis D2 of first inner peripheral wall 22 from three sides (one side of second axis D2 and both sides of third axis D3). The other of the pair of first outer walls 240 surrounds the other end of second axis D2 of first inner peripheral wall 22 from three sides (the other side of second axis D2 and both sides of third axis D3). A portion surrounded by the outer side face of first inner peripheral wall 22, the inner bottom face of first outer bottom wall 23, and the inner side face of first outer peripheral wall 24 constitutes second fitting recess 202 to which second connector 5 is fitted. Specifically, second inner peripheral wall 62 of second connector 5 is fitted into second fitting recess 202.

First housing 2 holds the plurality of first terminals 3 and first shield 4.

In the present embodiment, some (six) first terminals 3 (first connection terminals 32) of the plurality of (eight) first terminals 3 are provided on the pair of first horizontal inner walls 221. Specifically, three first connection terminals 32 are held on each of the pair of first horizontal inner walls 221. First connection terminal 32 is accommodated in a recess provided in first horizontal inner wall 221. Remaining (two) first terminals 3 (first specific terminals 31) among the plurality of (eight) first terminals 3 are accommodated in recesses formed on the pair of first outer walls 240.

In the present embodiment, first outer shield 41 sandwiches first outer peripheral wall 24. In the present embodiment, first inner shield 45 of first shields 4 is accommodated in a groove hole formed in first housing 2.

(2.1.2) First Terminal

First terminal 3 is a signal transmission terminal, and is formed by bending a belt-shaped metal plate. First terminal 3 is plated with gold.

The plurality of first terminals 3 include at least one first specific terminal 31. The plurality of first terminals 3 include at least one terminal (first connection terminals 32) other than first specific terminal 31. Here, among eight first terminals 3, two are first specific terminals 31, and the remaining six are first connection terminals 32.

Two first specific terminals 31 are disposed on both sides of second axis D2 in first connector 1. Two first specific terminals 31 are respectively held by first vertical outer walls 241 of the pair of first outer walls 240.

Six first connection terminals 32 are arranged side by side on second axis D2 in a region between two first specific terminals 31 on second axis D2 while being divided into three on both sides of third axis D3. Three of six first connection terminals 32 are held on each of the pair of first horizontal inner walls 221.

For example, first specific terminal 31 is a terminal for transmitting a relatively high-frequency signal. Two first specific terminals 31 have the same shape. For example, a signal current flowing from first circuit board 91 to second circuit board 92 flows through one of two first specific terminals 31. A signal current from second circuit board 92 to first circuit board 91 flows through the other of two first specific terminals 31.

First connection terminal 32 is a terminal for transmitting a relatively low-frequency signal. Some or all of the plurality (for example, six) of first connection terminals 32 may be terminals that transmit power. Here, the six first connection terminals 32 have the same shape. First connection terminal 32 may include terminals having different shapes.

(2.1.2.1) First Specific Terminal

Figure 5:
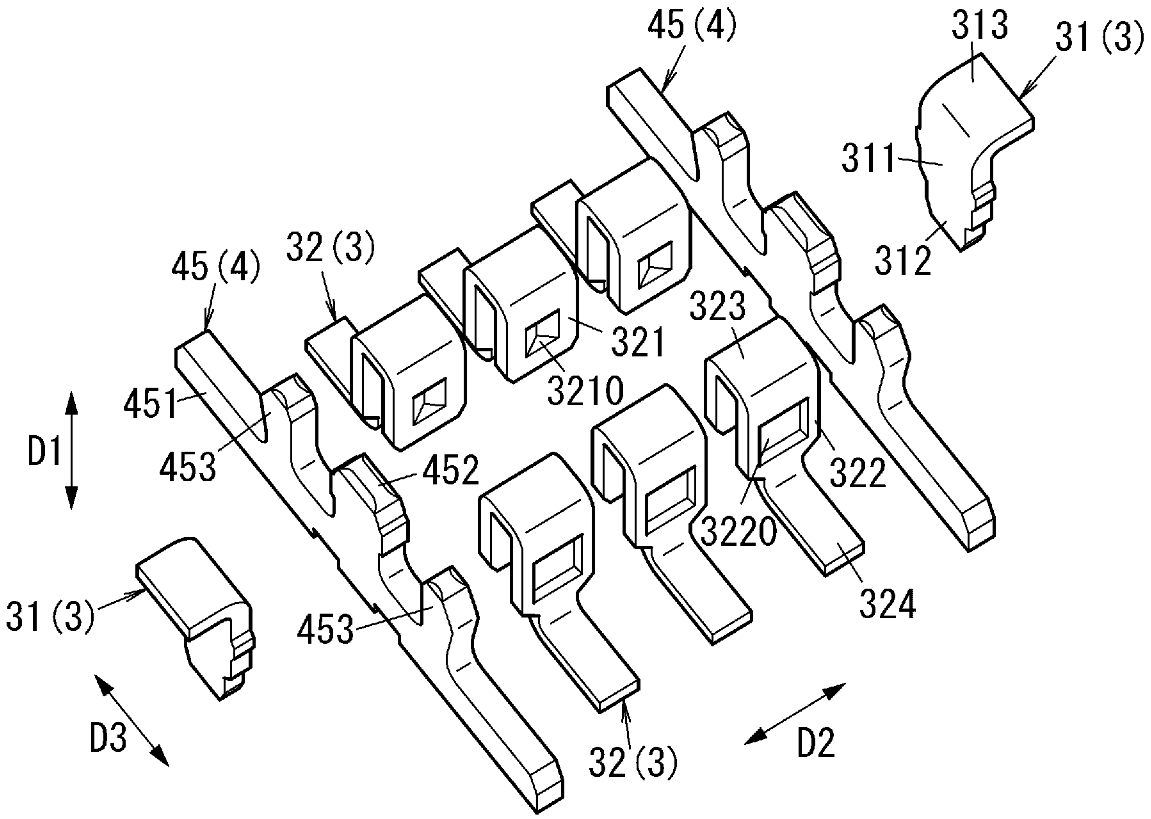
FIG. 5 is a perspective view of a first terminal and a first inner shield in the first connector.

As illustrated in FIG. 5, first specific terminal 31 includes main piece 311, terminal piece 312, and auxiliary piece 313, which are integrally formed. First specific terminal 31 has an L shape as viewed from third axis D3.

Figure 3:
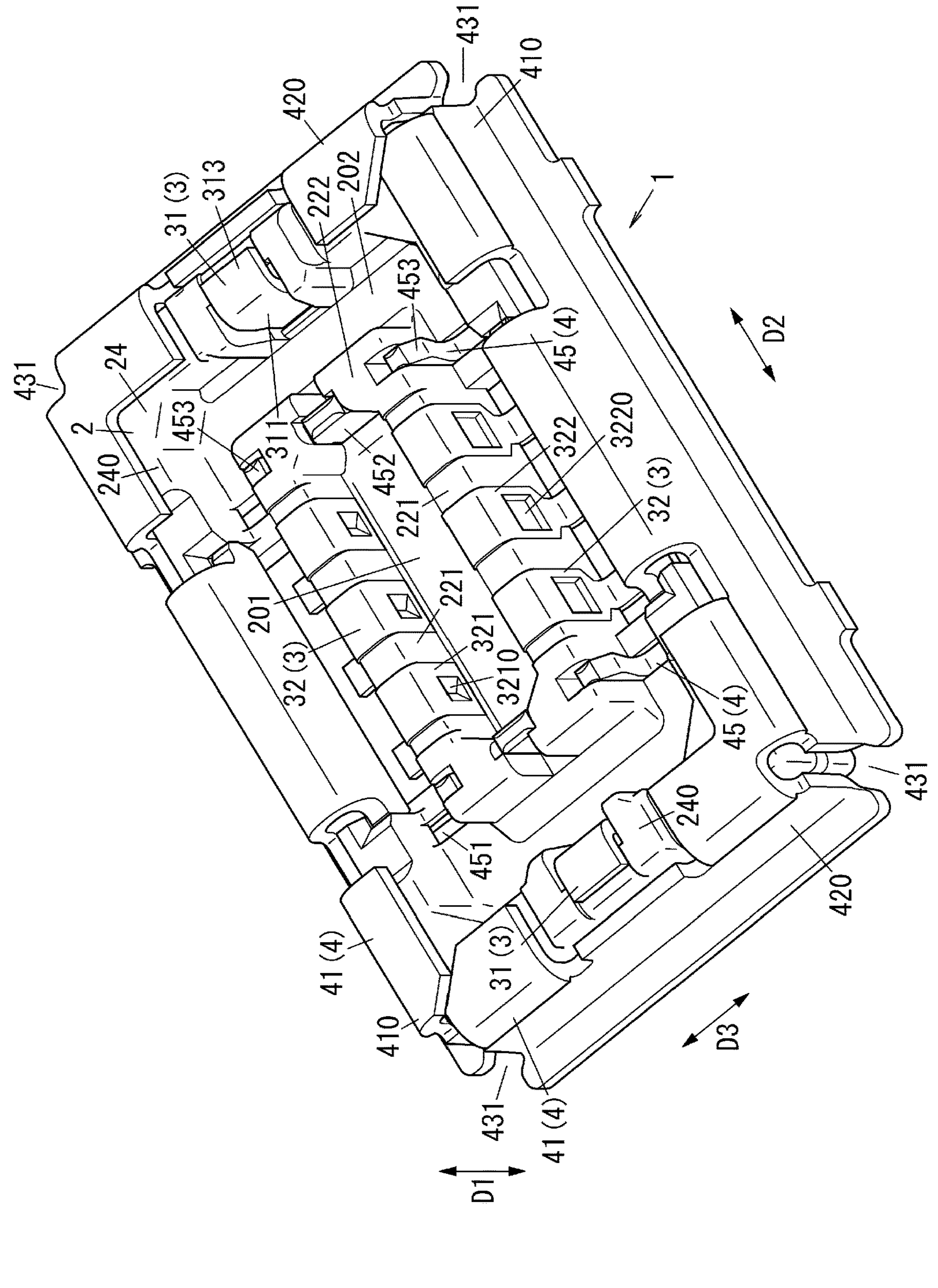
FIG. 3 is a perspective view of a first connector in the connector assembly.

Main piece 311 is a portion through which a signal current mainly flows in first specific terminal 31. As illustrated in FIG. 5, main piece 311 has a substantially rectangular flat plate shape having a thickness on second axis D2. A pair of holding protrusions for first housing 2 to hold first specific terminal 31 is formed on both end faces of main piece 311 on both sides of third axis D3. As illustrated in FIG. 3, the inner face of second axis D2 of main piece 311 is exposed to second fitting recess 202 of first housing 2.

Terminal piece 312 has a flat plate shape having a thickness on second axis D2. Terminal piece 312 is continuous from the upper end face of main piece 311. Main piece 311 and terminal piece 312 extend linearly along first axis D1. The width dimension (dimension of third axis D3) of terminal piece 312 is smaller by one step than the width dimension of main piece 311. As illustrated in FIG. 1, the distal end face (upper end face) of terminal piece 312 is exposed to the upper face of first outer bottom wall 23 of first housing 2.

Auxiliary piece 313 has a substantially rectangular flat plate shape having a thickness on first axis D1. Auxiliary piece 313 protrudes outward of second axis D2 from the lower end (upper end in FIG. 3) of main piece 311. As illustrated in FIG. 3, the lower face of auxiliary piece 313 is exposed to the lower face of first outer peripheral wall 24 of first housing 2. Auxiliary piece 313 can be used for inspecting the connection between first specific terminal 31 and conductor pattern 911 of first circuit board 91 by bringing an inspection terminal into contact with auxiliary piece 313 from the outside.

As illustrated in FIG. 10, first specific terminal 31 is connected to conductor pattern 911 of first circuit board 91. Specifically, first specific terminal 31 is bonded to conductor pattern 911 of first circuit board 91 by soldering at the upper end face (the end face along the thickness axis) of terminal piece 312.

As described above, first specific terminal 31 includes first board-connected portion 318 (terminal piece 312) connected to conductor pattern 911 of first circuit board 91. An end face of first board-connected portion 318 along the thickness axis overlaps first circuit board 91.

(2.1.2.2) First Connection Terminal

As illustrated in FIG. 5, first connection terminal 32 includes extending piece 321, contact piece 322, connecting piece 323, and terminal piece 324, which are integrally formed. Extending piece 321 and contact piece 322 have a contact point which is a specific portion physically contacting second connection terminal 72 in the fitted state.

Extending piece 321 has a substantially rectangular flat plate shape having a thickness on third axis D3. As illustrated in FIG. 3, the inner face of extending piece 321 on third axis D3 is exposed to first fitting recess 201 of first housing 2. One face of the thickness axis of extending piece 321 (the face on the inner side of third axis D3) is provided with recess 3210 recessed outward. In the fitted state, contact piece 721 of second connection terminal 72 in second connector 5 comes into contact with recess 3210. Here, contact piece 721 of second connection terminal 72 is in contact with the opening of recess 3210.

Contact piece 322 has a substantially rectangular flat plate shape having a thickness on third axis D3. As illustrated in FIG. 3, the outer face of contact piece 322 on third axis D3 is exposed to second fitting recess 202 of first housing 2. One face of the thickness axis of contact piece 322 (the face on the outer side of third axis D3) is provided with recess 3220 recessed inward. In the fitted state, step 7230 of second connection terminal 72 in second connector 5 comes into contact with recess 3220. Here, step 7230 of second connection terminal 72 is in contact with the opening of recess 3220.

Connecting piece 323 is curved in a U shape so as to connect the lower end of extending piece 321 and the lower end of contact piece 322. The lower face of connecting piece 323 is exposed to the lower face of first horizontal inner wall 221 of first housing 2.

Terminal piece 324 has a substantially rectangular flat plate shape having a thickness on first axis D1. Terminal piece 324 protrudes outward along third axis D3 from the upper end of contact piece 322. As illustrated in FIG. 1, the upper face of terminal piece 324 is exposed to the upper face of first housing 2.

Figure 12:
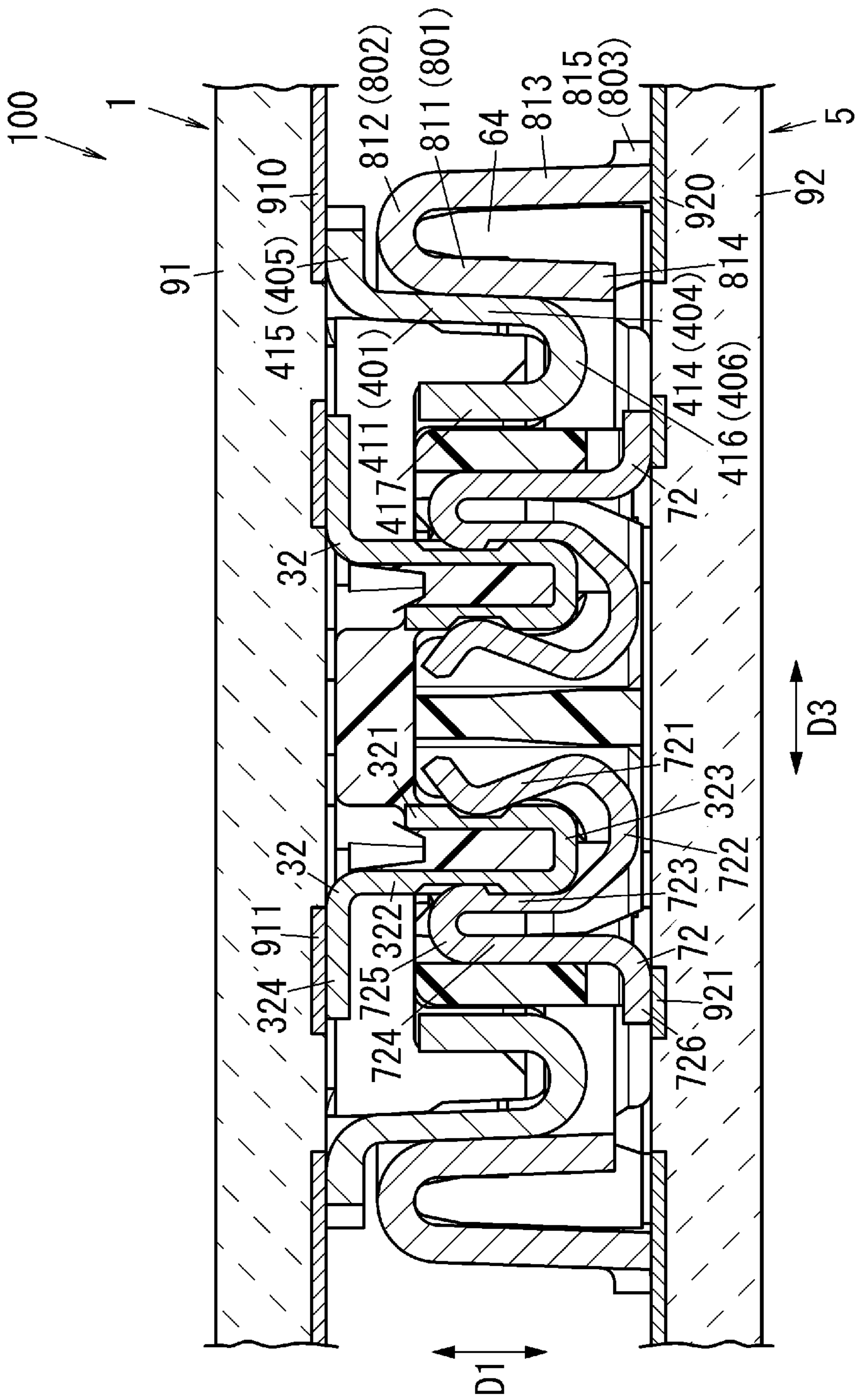
FIG. 12 is a cross-sectional view taken along line XII-XII of FIG. 2.

As illustrated in FIG. 12, first connection terminal 32 is connected to conductor pattern 911 of first circuit board 91 (a conductor pattern different from conductor pattern 911 to which first specific terminal 31 is connected). Specifically, first connection terminal 32 is connected to conductor pattern 911 of first circuit board 91 on the upper face (face intersecting the thickness axis) of terminal piece 324.

(2.1.3) First Shield

First shield 4 is an electromagnetic shield for shielding electromagnetic waves. First shield 4 reduces the influence of external noise (electromagnetic wave) on the signal current flowing through first terminal 3 and second terminal 7. In addition, first shield 4 reduces an influence of noise (electromagnetic wave) caused by a signal current flowing through first terminal 3 and second terminal 7 on an external electric device or the like.

As illustrated in FIG. 3, first shield 4 surrounds at least one of the plurality of first terminals 3. First shield 4 surrounds at least first specific terminal 31 among the plurality of first terminals 3. Here, first shield 4 surrounds the plurality of first specific terminals 31 and surrounds the plurality of first connection terminals 32.

The material of first shield 4 is selected from, for example, copper alloys such as phosphor bronze, corson copper, and titanium copper, stainless steel, aluminum alloy, nickel silver, and the like.

Figure 6:
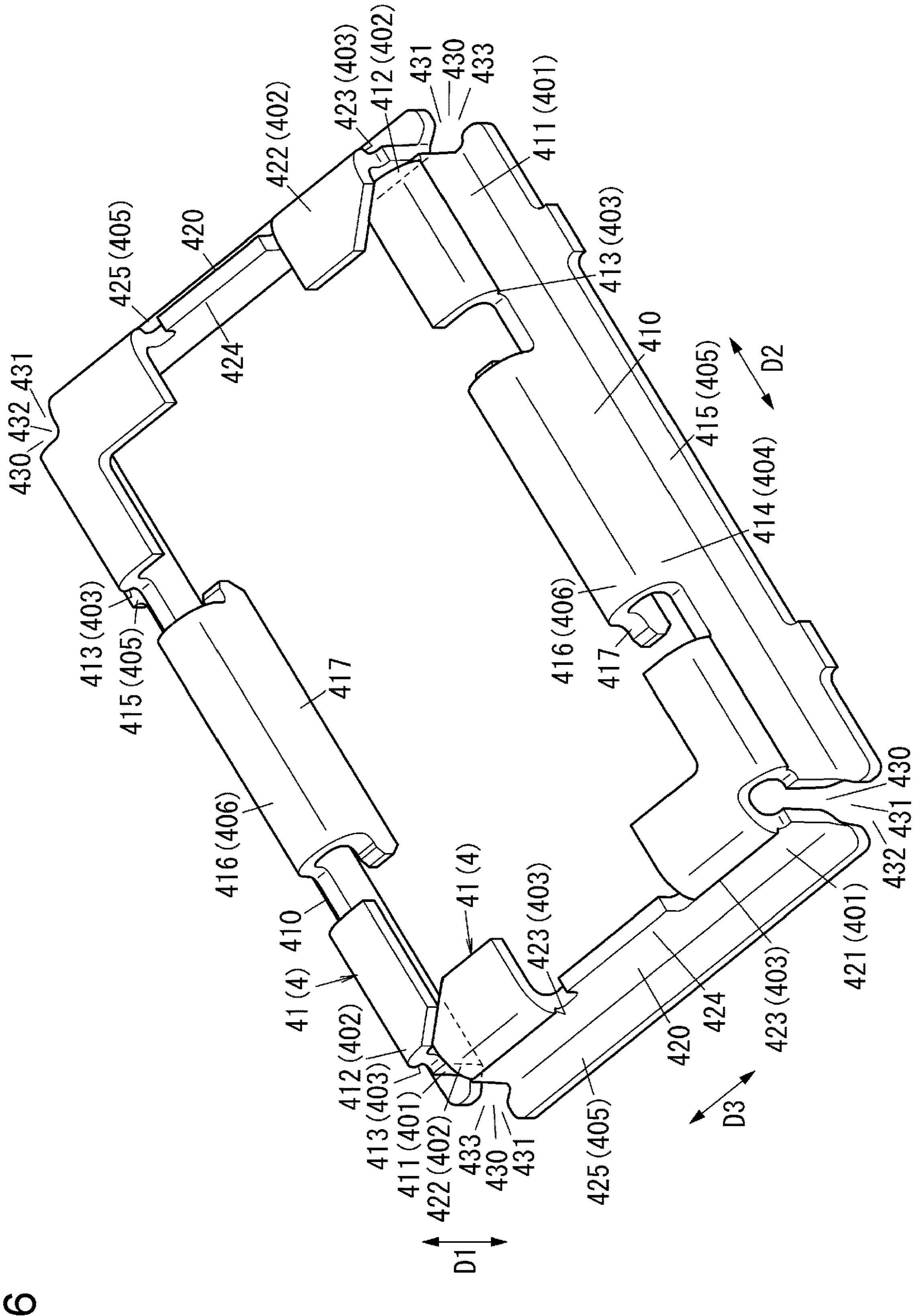
FIG. 6 is a perspective view of a first outer shield in the first connector.

As illustrated in FIGS. 5 and 6, first shield 4 includes first outer shield 41 and first inner shield 45.

(2.1.3.1) First Outer Shield

As illustrated in FIG. 3, first outer shield 41 is held by first outer peripheral wall 24 of first housing 2. First outer shield 41 surrounds the plurality of first terminals 3. First outer shield 41 is formed by, for example, subjecting a metal plate to punching and bending.

As illustrated in FIG. 6, first outer shield 41 includes a pair of first horizontal shields 410 and a pair of first vertical shields 420.

The pair of first horizontal shields 410 extends in second axis D2. As illustrated in FIG. 3, first horizontal shield 410 covers the outer side face of first outer wall 240 in first horizontal outer wall 242. Each of the pair of first horizontal shields 410 is provided across two adjacent first horizontal outer walls 242 so as to bridge a gap between two adjacent first horizontal outer walls 242. First horizontal shield 410 covers at least a part of the lower face of first horizontal outer wall 242.

The pair of first vertical shields 420 extends in third axis D3. As illustrated in FIG. 3, first vertical shield 420 covers the outer side face of first outer wall 240 in first vertical outer wall 241. First vertical shield 420 covers at least a part of the lower face of first vertical outer wall 241. Here, first vertical shield 420 covers the lower face of first vertical outer wall 241 so that the lower end face of auxiliary piece 313 of first specific terminal 31 is exposed.

As described above, first shield 4 includes a pair of horizontal shields (first horizontal shield 410) extending on second axis D2 intersecting first axis D1 and spaced apart from each other on third axis D3 intersecting both first axis D1 and second axis D2, and a pair of vertical shields (first vertical shield 420) extending on third axis D3 and spaced apart from each other on second axis D2.

As illustrated in FIG. 6, one of the pair of first horizontal shields 410 is connected to one of the pair of first vertical shields 420, and is integrally formed to have an L shape in a plan view. The other of the pair of first horizontal shields 410 is connected to the other of the pair of first vertical shields 420, and is integrally formed to have an L shape in a plan view. Note that one of the pair of first horizontal shields 410 and the other of the pair of first vertical shields 420 are separated, and the other of the pair of first horizontal shields 410 and the one of the pair of first vertical shields 420 are separated.

First horizontal shield 410 and first vertical shield 420 connected thereto are connected to each other at the end faces of the lower walls, and the end faces of the side walls along first axis D1 are separated from each other. Specifically, first outer shield 41 has notch 432 extending along opening 431, more specifically, first axis D1 at a corner 430 where first horizontal shield 410 and first vertical shield 420 intersect. In addition, first outer shield 41 has gap 433 extending along opening 431, more specifically, first axis D1 at corner 430 where first horizontal shield 410 and first vertical shield 420, which are not connected to each other, intersect.

As described above, first shield 4 includes the horizontal shield (first horizontal shield 410) extending on second axis D2 intersecting first axis D1, the vertical shield (first vertical shield 420) extending on third axis D3 intersecting both first axis D1 and second axis D2, and opening 431 formed at corner 430 where the horizontal shield and the vertical shield intersect. More specifically, first shield 4 includes a pair of horizontal shields (first horizontal shields 410) separated from each other on third axis D3, a pair of vertical shields (first vertical shields 420) separated from each other on second axis D2, and four openings 431 formed in four corners 430. Since first outer shield 41 has opening 431, first horizontal shield 410 is easily bent on third axis D3, and first vertical shield 420 is easily bent on second axis D2. As a result, first shield 4 is likely to be deformed when first connector 1 is fitted to second connector 5, and workability when first connector 1 is fitted to second connector 5 can be improved.

As illustrated in FIG. 6, first horizontal shield 410 includes first side wall 411, first curved portion 412, protrusion 413, first extending portion 414, joint portion 415, third curved portion 416, and third side wall 417.

First side wall 411 has a substantially rectangular flat plate shape having a thickness on third axis D3. First side wall 411 extends along first axis D1 (vertical axis). First side wall 411 extends in second axis D2.

First curved portion 412 is connected to the lower end of first side wall 411. First curved portion 412 is curved from the lower end of first side wall 411 toward the inside of third axis D3. Specifically, first curved portion 412 is curved in an L shape as viewed from second axis D2. First horizontal shield 410 has at least one (here, a plurality of) first curved portion 412. The plurality of first curved portions 412 are arranged apart from each other in second axis D2.

Protrusion 413 protrudes with respect to third axis D3. Protrusion 413 protrudes outward of third axis D3. Protrusion 413 extends along second axis D2. Protrusion 413 is provided on at least one of first side wall 411 and first curved portion 412. Here, protrusion 413 is provided in a stepped shape at a portion near a boundary where first side wall 411 and first curved portion 412 are connected. More specifically, since the upper end portion of first curved portion 412 is disposed outside of third axis D3 with respect to the lower end portion of first side wall 411, protrusion 413 is provided in a stepped shape. Protrusion 413 is provided with an inclined face on the upper side of first axis D1 with respect to the apex of protrusion 413. Protrusion 413 is provided asymmetrically with respect to the apex as viewed from second axis D2. Protrusion 413 is provided over the entire length of first curved portion 412 on second axis D2. Protrusion 413 forms a part of a peripheral edge of opening 431.

First horizontal shield 410 has at least one (here, a plurality of) protrusion 413. The plurality of protrusions 413 are arranged apart from each other on second axis D2. The plurality of protrusions 413 are provided corresponding to the plurality of first curved portions 412. Each protrusion 413 is provided over the entire length along second axis D2 of the corresponding first curved portion 412.

First extending portion 414 is provided at a portion where first curved portion 412 is not provided at the lower end of first side wall 411. First extending portion 414 is positioned between two first curved portions 412 on second axis D2. In other words, first extending portion 414 is provided between the plurality of protrusions 413 on second axis D2. First extending portion 414 extends downward from the lower end of first side wall 411.

Third curved portion 416 is connected to the lower end of first extending portion 414. Third curved portion 416 is curved from the lower end of first extending portion 414 toward the inside of third axis D3 and further curved upward. Third curved portion 416 is curved in a U shape so as to protrude toward the lower side of first axis D1 as viewed from second axis D2.

Figure 11:
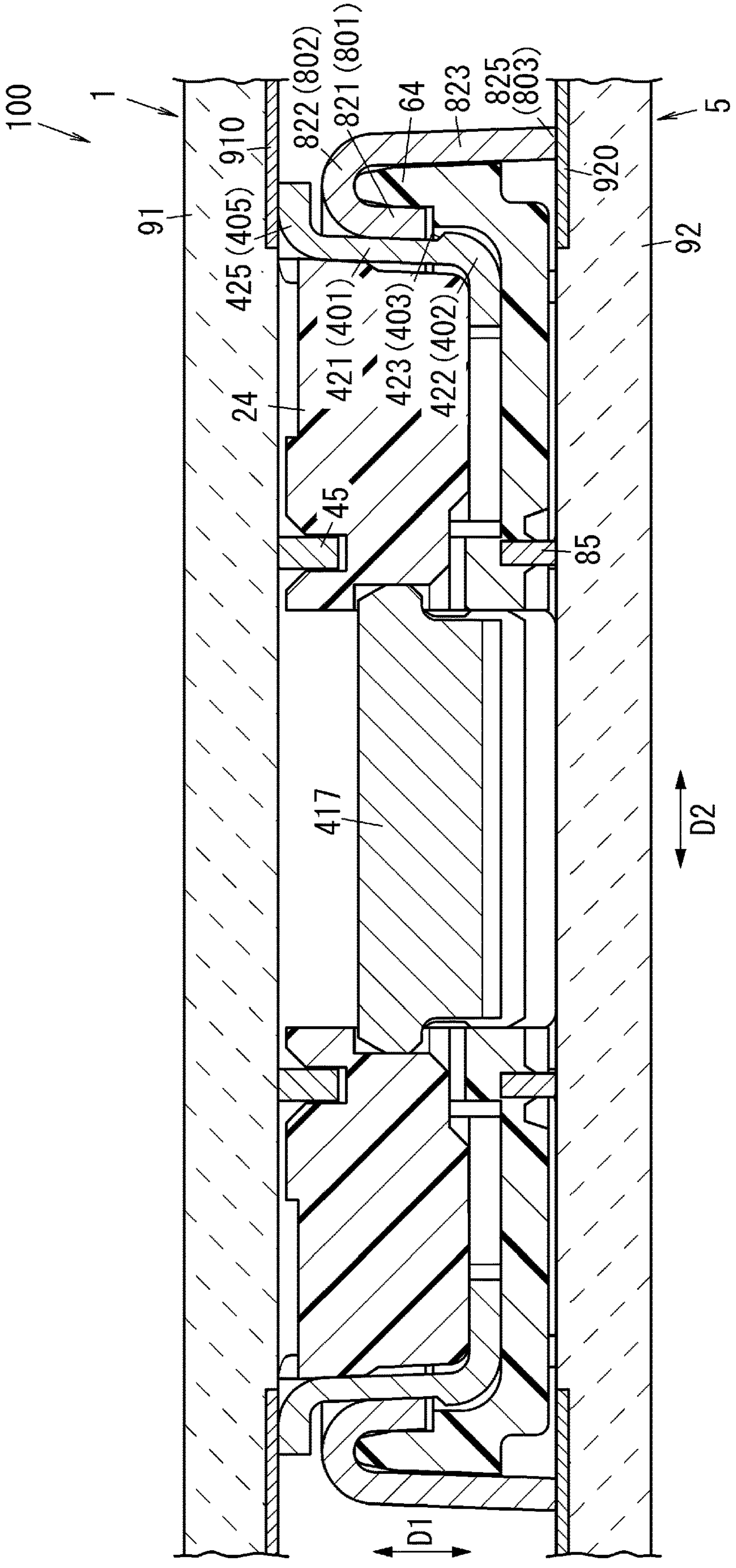
FIG. 11 is a cross-sectional view taken along line XI-XI of FIG. 2.

Third side wall 417 has a plate shape having a thickness on third axis D3. Third side wall 417 is connected to an upper end of third curved portion 416. Third side wall 417 faces first side wall 411 on third axis D3. Third side wall 417 is positioned inside of first connector 1 with respect to first side wall 411. A pair of holding protrusions for first housing 2 to hold first horizontal shield 410 is formed on both end faces of third side wall 417 on second axis D2. As illustrated in FIGS. 3 and 11, third side wall 417 is positioned in a gap between two adjacent first horizontal outer walls 242. As illustrated in FIG. 16, in the fitted state, third side wall 417 is positioned on one side (inner side) of third axis D3 with respect to second side wall 811 of second connector 5, and is positioned on one side (outer side) of third axis D3 with respect to second terminal 7 (second connection terminal 72) of second connector 5.

Figure 13:
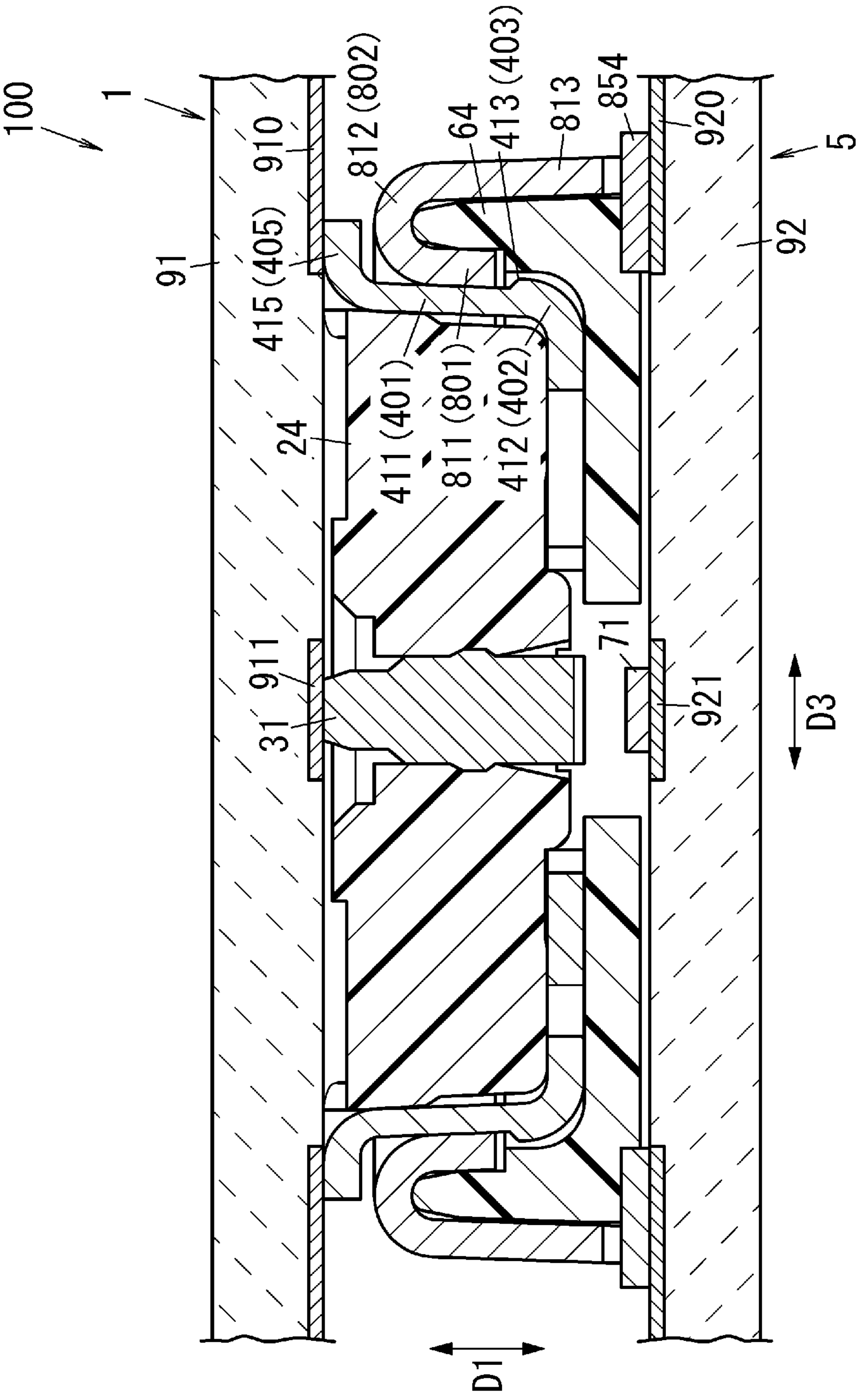
FIG. 13 is a cross-sectional view taken along line XIII-XIII of FIG. 2.
Figure 14:
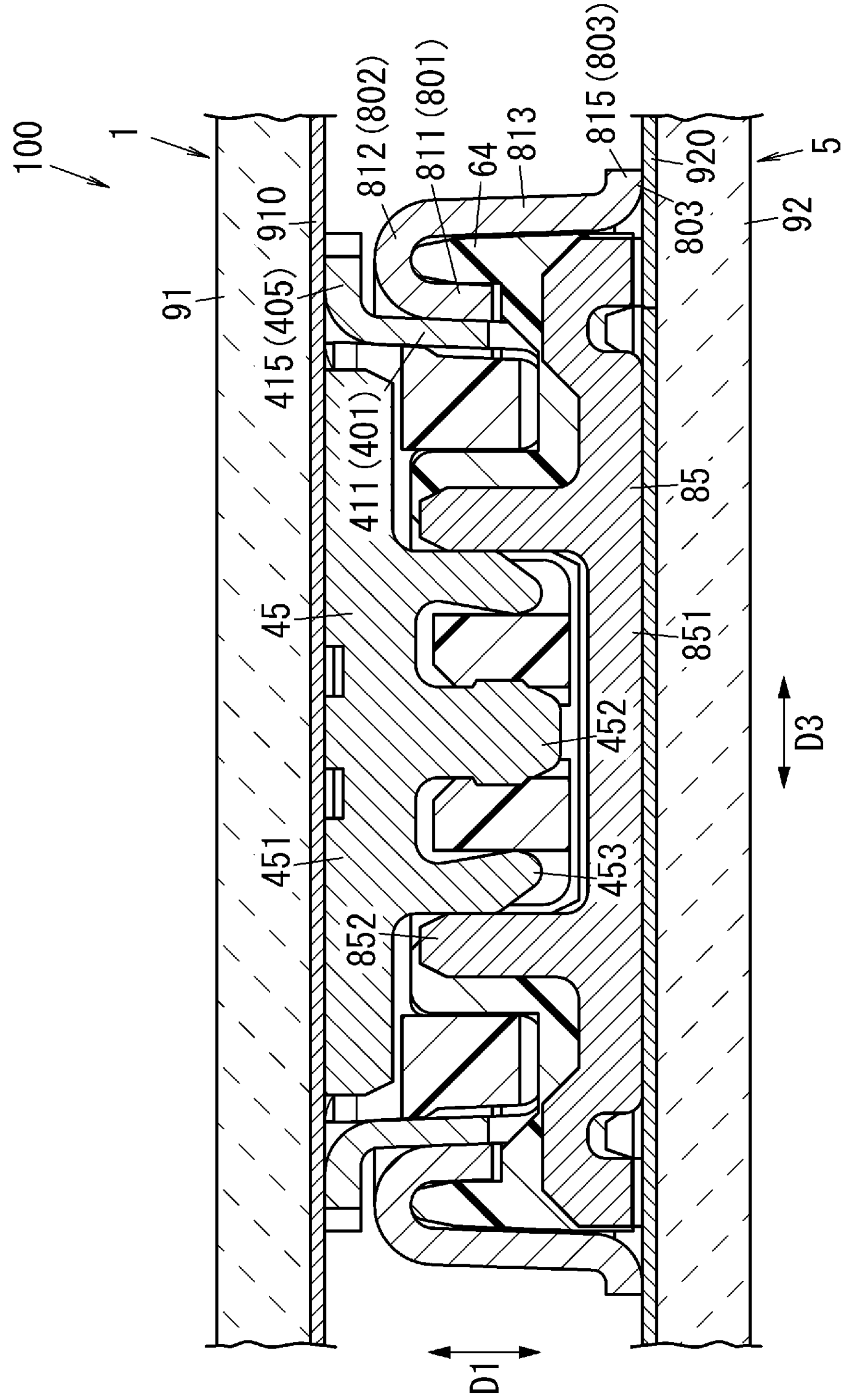
FIG. 14 is a cross-sectional view taken along line XIV-XIV of FIG. 2.

Joint portion 415 is connected to the upper end of first side wall 411. Joint portion 415 is curved from the upper end of first side wall 411 to the outside of third axis D3 and extends along third axis D3. As illustrated in FIGS. 12 to 14, the upper face of joint portion 415 is connected to ground pattern 910 of first circuit board 91.

In first horizontal shield 410, third side wall 417 is disposed between the pair of first outer walls 240 of first housing 2.

As viewed from third axis D3, first side wall 411 and third side wall 417 of first horizontal shield 410 face each other on the outside of first connection terminal 32. Therefore, on third axis D3, first connection terminal 32 is doubly shielded by first side wall 411 and third side wall 417.

As illustrated in FIG. 6, first vertical shield 420 includes first side wall 421, first curved portion 422, protrusion 423, first extending portion 424, and joint portion 425. First side wall 421 has a substantially rectangular flat plate shape having a thickness on second axis D2. First side wall 421 extends along first axis D1 (vertical axis). First side wall 421 also extends in third axis D3.

First curved portion 422 is connected to the lower end of first side wall 421. First curved portion 422 is curved from the lower end of first side wall 421 toward the inside of second axis D2. Specifically, first curved portion 422 is curved in an L shape as viewed from third axis D3. First vertical shield 420 has at least one (here, a plurality of) first curved portion 422. The plurality of first curved portions 422 are arranged apart from each other in third axis D3.

Protrusion 423 protrudes with respect to second axis D2. Protrusion 413 protrudes outward of second axis D2. Protrusion 423 extends along third axis D3. Protrusion 423 is provided on at least one of first side wall 421 and first curved portion 422. Here, protrusion 423 is provided in a stepped shape at a portion near a boundary where first side wall 421 and first curved portion 422 are connected. More specifically, since the upper end portion of first curved portion 422 is disposed outside of second axis D2 with respect to the lower end portion of first side wall 421, protrusion 423 is provided in a stepped shape. Protrusion 423 is provided with an inclined face on the upper side of first axis D1 with respect to the apex of protrusion 423. Protrusion 423 is provided asymmetrically with respect to the apex as viewed from third axis D3. Protrusion 423 is provided over the entire length of the corresponding first curved portion 422 in third axis D3. Protrusion 423 forms a part of a peripheral edge of opening 431.

Note that protrusions 413 and 423 may be provided with an inclined face positioned on the upper side of first axis D1 and an inclined face positioned on the lower side with respect to the apexes of protrusions 413 and 423. Further, protrusion 413 may be provided symmetrically with respect to the apex of protrusion 413 as viewed from second axis D2. Protrusion 423 may be provided symmetrically with respect to the apex of protrusion 423 as viewed from third axis D3.

First vertical shield 420 has at least one (here, a plurality of) protrusion 423. The plurality of protrusions 423 are arranged apart from each other on third axis D3. The plurality of protrusions 423 are provided corresponding to the plurality of first curved portions 422. Each protrusion 423 is provided over the entire length along third axis D3 of corresponding first curved portion 422.

First extending portion 424 is provided at a portion where first curved portion 422 is not provided at the lower end of first side wall 421. First extending portion 424 is positioned between two first curved portions 422 on third axis D3. In other words, first extending portion 424 is provided between the plurality of protrusions 423 on third axis D3. First extending portion 424 extends downward from the lower end of first side wall 421.

Joint portion 425 is connected to the upper end of first side wall 421. Joint portion 425 is curved from the upper end of first side wall 421 to the outside of second axis D2 and extends along second axis D2. As illustrated in FIGS. 10 and 11, the upper face of joint portion 425 is connected to ground pattern 910 of first circuit board 91.

First vertical shield 420 is held by first housing 2 together with first horizontal shield 410.

As illustrated in FIG. 3, on second axis D2, the outside of first specific terminal 31 and first side wall 421 of first vertical shield 420 face each other. The dimension of third axis D3 of first side wall 421 of first vertical shield 420 is greater than the dimension of third axis D3 of first specific terminal 31. When viewed from second axis D2, entire first specific terminal 31 is included in first side wall 421. In the present embodiment, first side wall 421 is parallel to main piece 311 of first specific terminal 31.

As described above, first shield 4 (first horizontal shield 410, first vertical shield 420) includes first side wall 401 (411, 421), first curved portion 402 (412, 422), and protrusion 403 (413, 423). First side wall 401 (411, 421) extends in the vertical axis. First curved portion 402 (412, 422) is connected to the lower end of first side wall 401 (411, 421). First curved portion 402 (412, 422) is curved from a direction along the vertical axis to a direction along a horizontal axis (third axis D3, second axis D2) intersecting the vertical axis. Protrusion 403 (413, 423) is provided on at least one of first side wall 401 (411, 421) and first curved portion 402 (412, 422). Protrusion 403 (413, 423) protrudes along a horizontal axis (third axis D3, second axis D2). Since protrusion 403 is provided in first shield 4, a so-called click sensation can be generated when second connector 5 is fitted to first connector 1. Therefore, it is possible to allow the user to easily perceive that first connector 1 and second connector 5 are fitted.

In addition, protrusion 403 (413, 423) is provided in a stepped shape at a portion where first side wall 401 (411, 421) and first curved portion 402 (412, 422) are connected. As a result, for example, as compared with a case where the protrusion is provided on the first side wall, the portion where protrusion 403 is provided can be easily deformed when first connector 1 is fitted to second connector 5, and as a result, a click sensation is easily generated.

In addition, protrusion 403 (413, 423) forms a part of a peripheral edge of opening 431.

In addition, first shield 4 (first horizontal shield 410, first vertical shield 420) has a plurality of protrusions 403 (413, 423) arranged on an axis (second axis D2, third axis D3) intersecting both the vertical axis and the horizontal axis. This makes it easy to generate a click sensation.

First shield 4 (first horizontal shield 410, first vertical shield 420) has extending portion 404 (first extending portion 414, 424) between the plurality of protrusions 403 (413, 423). Extending portion 404 (first extending portion 414, 424) extends downward from first side wall 401 (411, 421). This makes it possible to improve the shielding property against the electromagnetic waves in the fitted state.

First shield 4 (first horizontal shield 410) has third curved portion 406 (416). Third curved portion 406 (416) is connected to the lower end of extending portion 404 (first extending portion 414). Third curved portion 406 (416) is curved from the direction along the vertical axis toward the direction along the horizontal axis (third axis D3). Third curved portion 406 (416) is curved from the direction along the vertical axis to the direction substantially along the horizontal axis (third axis D3). This makes it possible to improve the shielding property against the electromagnetic waves in the fitted state.

First shield 4 (first horizontal shield 410, first vertical shield 420) includes first ground connection portions 405 (joint portions 415, 425) connected to ground patterns 910 of first circuit board 91.

(2.1.3.2) First Inner Shield

First inner shield 45 is disposed between two of the plurality of first terminals 3. Here, first inner shield 45 is disposed between first specific terminal 31 and first connection terminal 32.

As illustrated in FIG. 3, in the present embodiment, first shield 4 includes two first inner shields 45. Two first inner shields 45 are arranged side by side on second axis D2 so as to separate one first specific terminal 31 from the plurality of (six) first connection terminals 32, and separate one first connection terminal 32 from the plurality of first specific terminals 31.

As described above, since first inner shield 45 is disposed between two first specific terminals 31, it is possible to reduce the influence of noise caused by the signal current flowing through one first specific terminal 31 on the signal current flowing through other first specific terminal 31 and first connection terminal 32.

As illustrated in FIG. 5, first inner shield 45 includes main piece 451, opposed piece 452, and a pair of support pieces 453.

Main piece 451 has a rectangular plate shape having a thickness on second axis D2 and being long on third axis D3. Opposed piece 452 has a thickness on second axis D2 and has a plate shape extending downward from the lower end face in the central portion of third axis D3 of main piece 451. The pair of support pieces 453 has a plate shape extending downward from both sides of opposed piece 452 on third axis D3 on the lower end face of main piece 451.

As illustrated in FIG. 3, first inner shield 45 is fixed to the first housing. Opposed piece 452 and the pair of support pieces 453 are accommodated in a groove formed on the upper face of first vertical inner wall 222. The inner face of opposed piece 452 on second axis D2 is exposed to first fitting recess 201. The outer face of opposed piece 452 on second axis D2 is exposed to second fitting recess 202. The outer face of third axis D3 of each of the pair of support pieces 453 is exposed to second fitting recess 202. A part of the lower face of main piece 451 outside of support piece 453 is exposed to second fitting recess 202.

Here, in a state where first shield 4 is not connected to ground pattern 910 of first circuit board 91, first outer shield 41 and first inner shield 45 are separated from each other and are not electrically connected to each other.

(2.2) Second Connector

Second connector 5 is a socket (female connector), and includes second housing 6, a plurality of (in the present embodiment, eight) second terminals 7, and second shield 8 as illustrated in FIGS. 1 and 7 to 9.

(2.2.1) Second Housing

Second housing 6 is made of an insulating resin material and is formed in a flat substantially rectangular parallelepiped shape elongated along second axis D2. In second housing 6, both sides of third axis D3 in the central portion of second axis D2 are notched in a substantially rectangular shape as viewed from first axis D1. In second housing 6, both sides of second axis D2 in the central portion of third axis D3 are notched in a substantially rectangular shape as viewed from first axis D1.

Figure 7:
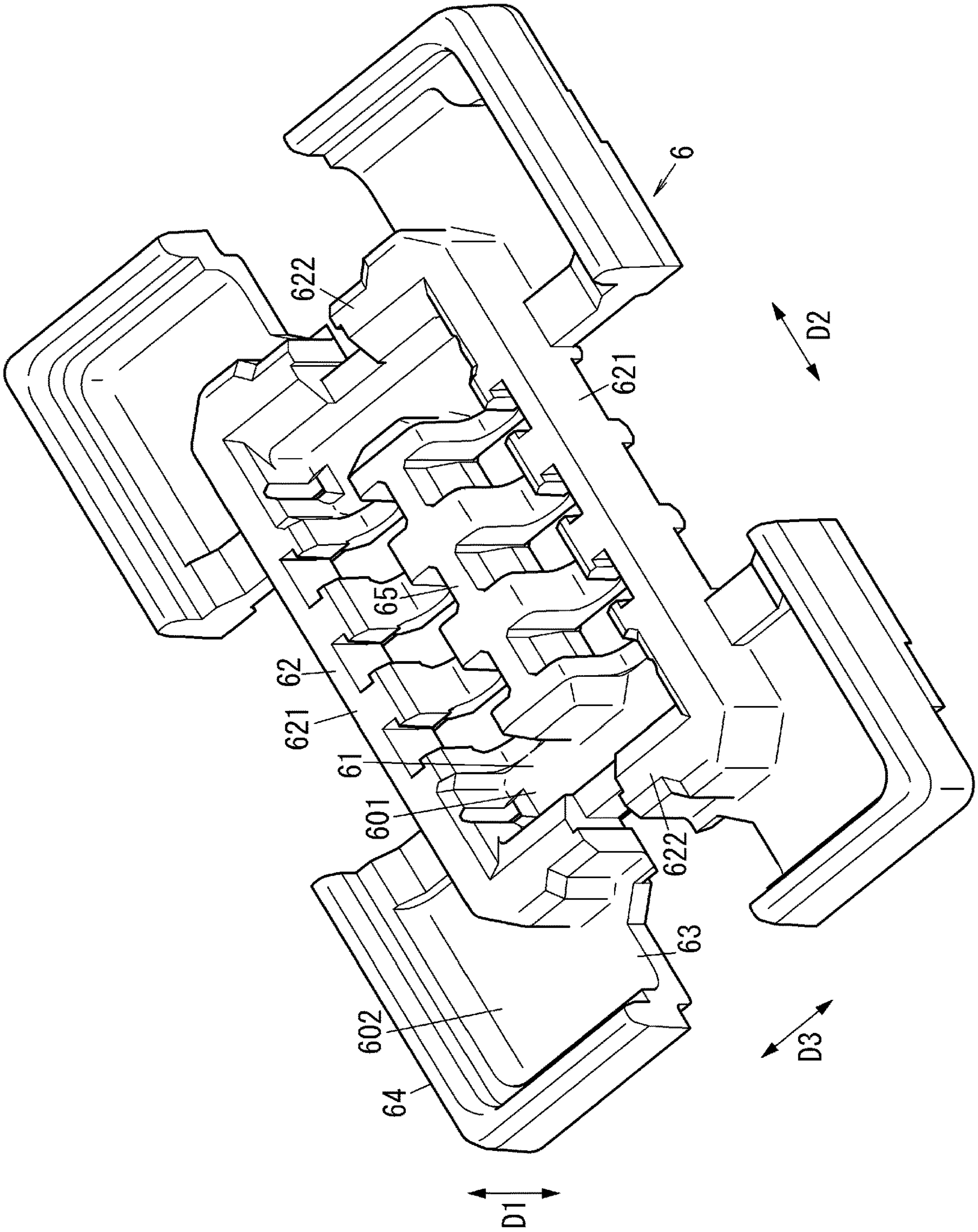
FIG. 7 is a perspective view of a second housing in the second connector.

As illustrated in FIG. 7, second housing 6 includes second inner bottom wall 61, second inner peripheral wall 62, second outer bottom wall 63, second outer peripheral wall 64, and base 65. Second inner bottom wall 61, second inner peripheral wall 62, second outer bottom wall 63, second outer peripheral wall 64, and base 65 are integrally formed.

Second inner bottom wall 61 has a rectangular plate shape elongated in second axis D2.

Second inner peripheral wall 62 protrudes upward from the peripheral edge of second inner bottom wall 61 and has a rectangular frame shape in a plan view. Specifically, second inner peripheral wall 62 includes a pair of second horizontal inner walls 621 and a pair of second vertical inner walls 622. The pair of second horizontal inner walls 621 is a pair of walls elongated in second axis D2 in second inner peripheral wall 62. The pair of second vertical inner walls 622 is a pair of walls elongated in third axis D3 in second inner peripheral wall 62.

Base 65 has a rectangular parallelepiped shape elongated in second axis D2, and protrudes upward from the center of second inner bottom wall 61. A portion surrounded by the inner bottom face of second inner bottom wall 61, the inner side face of second inner peripheral wall 62, and the outer face of base 65 constitutes third fitting recess 601 into which first connector 1 is fitted. Specifically, first inner peripheral wall 22 of first connector 1 is fitted into third fitting recess 601.

Second outer bottom wall 63 includes four partial bottom walls extending in a rectangular shape in a plane orthogonal to first axis D1 from each of the four corners of second inner bottom wall 61.

Second outer peripheral wall 64 protrudes upward from the peripheral edge of second outer bottom wall 63 so as to surround second inner peripheral wall 62. Second outer peripheral wall 64 has a rectangular frame shape in which respective central portions of the four sides are cut out in a plan view.

A portion surrounded by the outer face of second inner peripheral wall 62, the inner bottom face of second outer bottom wall 63, and the inner side face of second outer peripheral wall 64 constitutes fourth fitting recess 602. First outer peripheral wall 24 of first connector 1 is fitted into fourth fitting recess 602.

Second housing 6 holds the plurality of second terminals 7 and second shield 8.

In the present embodiment, second housing 6 is an insert-molded article including some (six) second terminals 7 (second connection terminals 72) among the plurality of (eight) second terminals 7 and second inner shield 85 among second shield 8 as insert articles. As shown in FIG. 1, in the present embodiment, second connection terminal 72 is provided across second horizontal inner wall 621 and base 65. Specifically, three second connection terminals 72 are provided on each of the pair of second horizontal inner walls 621. In the present embodiment, remaining (two) second terminals 7 (second specific terminals 71) among the plurality of (eight) second terminals 7 are accommodated in recesses formed in the pair of second vertical inner walls 622.

In the present embodiment, second outer shield 81 of second shield 8 sandwiches second outer peripheral wall 64.

(2.2.2) Second Terminal

Second terminal 7 is a signal transmission terminal, and is formed by bending a belt-shaped metal plate. Second terminal 7 is plated with gold. The plurality of second terminals 7 are in contact with the plurality of first terminals 3 of first connector 1 in the fitted state in which first connector 1 and second connector 5 are fitted to each other.

The plurality of second terminals 7 include at least one second specific terminal 71. The plurality of second terminals 7 include at least one terminal (second connection terminals 72) other than second specific terminal 71. Here, among eight second terminals 7, two are second specific terminals 71, and the remaining six are second connection terminals 72.

Two second specific terminals 71 are disposed on both sides of second axis D2 in second connector 5. Two second specific terminals 71 are respectively held by the pair of second vertical inner walls 622.

Six second connection terminals 72 are arranged side by side on second axis D2 in a region between two second specific terminals 71 on second axis D2 while being divided into three on both sides of third axis D3. Three of six second connection terminals 72 are held on each of the pair of second horizontal inner walls 621.

For example, second specific terminal 71 is a terminal for transmitting a relatively high-frequency signal. Two second specific terminals 71 have the same shape. For example, a signal current flowing from first circuit board 91 to second circuit board 92 flows through one of two second specific terminals 71, and a signal current flowing from second circuit board 92 to first circuit board 91 flows through the other of two second specific terminals 71.

Second connection terminal 72 is a terminal for transmitting a relatively low-frequency signal. Some or all of the plurality of (for example, six) second connection terminals 72 may be terminals for transmitting power. Six second connection terminals 72 have the same shape. Second connection terminal 72 may include terminals having different shapes.

(2.2.2.1) Second Specific Terminal

Second specific terminal 71 is in contact with first specific terminal 31 and connected to first specific terminal 31 in the fitted state.

Figure 8:
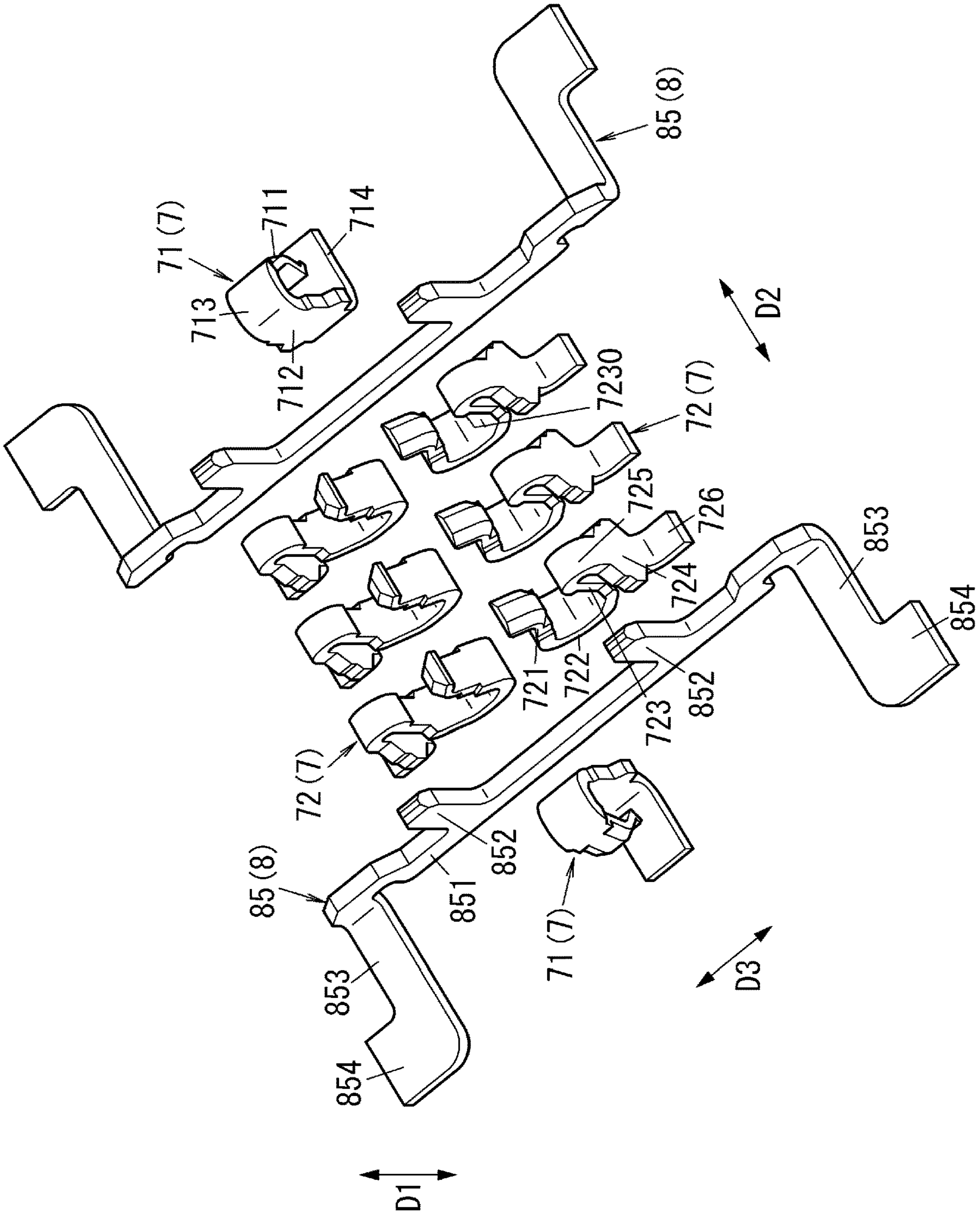
FIG. 8 is a perspective view of a second terminal and a second inner shield in the second connector.

As illustrated in FIG. 8, second specific terminal 71 includes contact piece 711, main piece 712, connecting piece 713, and terminal piece 714, which are integrally formed.

Contact piece 711 has a plate shape having a thickness on second axis D2, and is curved in a C shape as viewed from third axis D3 so as to protrude outward from second axis D2. The outer face of contact piece 711 on second axis D2 is inclined such that both sides of third axis D3 of contact piece 711 are gradually thinner than the central portion.

Main piece 712 has a substantially rectangular flat plate shape having a thickness on second axis D2. A pair of holding protrusions for second housing 6 to hold second specific terminal 71 is formed on both end faces of main piece 712 on both sides of third axis D3. The width dimension (dimension of third axis D3) of main piece 712 is greater than the width dimension of contact piece 711.

Connecting piece 713 is curved in an inverted U shape so as to connect the upper end of contact piece 711 and the upper end of main piece 712. Connecting piece 713 applies a repulsive force (elastic force) against the force along second axis D2 to second specific terminal 71. The width dimension (dimension of third axis D3) of connecting piece 713 is smaller than the width dimension of main piece 712 and greater than the width dimension of contact piece 711.

Terminal piece 714 has a substantially rectangular flat plate shape having a thickness on first axis D1. Terminal piece 714 is curved from the lower end of main piece 712 and protrudes toward the outside of second axis D2.

As illustrated in FIG. 10, second specific terminal 71 is connected to conductor pattern 921 of second circuit board 92. Specifically, second specific terminal 71 is connected to conductor pattern 921 of second circuit board 92 on the lower face (face intersecting the thickness axis) of terminal piece 714.

As described above, second specific terminal 71 includes second board-connected portion 718 (terminal piece 714) connected to conductor pattern 921 of second circuit board 92. The face of second board-connected portion 718 intersecting the thickness axis overlaps second circuit board 92.

(2.2.2.2) Second Connection Terminal

As illustrated in FIG. 8, second connection terminal 72 includes contact piece 721, spring piece 722, rising piece 723, falling piece 724, connecting piece 725, and terminal piece 726, which are integrally formed. Contact piece 721 and rising piece 723 have a contact point which is a specific portion physically contacting the first connection terminal in the fitted state.

Contact piece 721 has a plate shape having a thickness on third axis D3, and is curved in a C shape when viewed from second axis D2. The outer face of contact piece 721 on third axis D3 is inclined such that both sides of third axis D3 of contact piece 721 are gradually thinner than the central portion. In the fitted state, contact piece 721 is fitted into recess 3210 formed in extending piece 321 of first connection terminal 32.

Spring piece 722 is formed in a U shape when viewed from second axis D2. Spring piece 722 is elastically deformed to third axis D3 so that the dimension of the upper opening changes. Due to the elastic force of spring piece 722, contact piece 721 elastically contacts first connection terminal 32 in the fitted state (see FIG. 12).

Rising piece 723 has a substantially rectangular plate shape having a thickness on third axis D3. The lower end of rising piece 723 is connected to the upper end of spring piece 722. In the fitted state, rising piece 723 comes into contact with first connection terminal 32 (see FIG. 12).

Rising piece 723 has step 7230 in the middle of the vertical axis. In the fitted state, a portion of rising piece 723 above step 7230 comes into contact with recess 3220 formed in contact piece 322 of first connection terminal 32.

Falling piece 724 has a substantially rectangular flat plate shape having a thickness on third axis D3. A pair of holding protrusions for second housing 6 to hold second connection terminal 72 is formed on both end faces of falling piece 724 on second axis D2.

Connecting piece 725 is curved in an inverted U shape so as to connect the upper end of rising piece 723 and the upper end of falling piece 724. Connecting piece 725 applies a repulsive force (elastic force) against the force along third axis D3 to second connection terminal 72.

Terminal piece 726 has a substantially rectangular flat plate shape having a thickness on first axis D1. Terminal piece 726 protrudes outward along third axis D3 from the lower end of falling piece 724. The lower face of terminal piece 726 is exposed to the lower face of second housing 6.

As illustrated in FIG. 12, second connection terminal 72 is connected to conductor pattern 921 of second circuit board 92. Specifically, second connection terminal 72 is connected to conductor pattern 921 of second circuit board 92 on the lower face (face intersecting the thickness axis) of terminal piece 726.

(2.2.3) Second Shield

Second shield 8 is an electromagnetic shield for shielding electromagnetic waves. Second shield 8 reduces the influence of external noise (electromagnetic wave) on the signal current flowing through first terminal 3 and second terminal 7. In addition, second shield 8 reduces the influence of noise (electromagnetic wave) caused by the signal current flowing through first terminal 3 and second terminal 7 on external electric equipment or the like. Second shield 8 is in contact with first shield 4 in the fitted state.

As illustrated in FIG. 1, second shield 8 surrounds at least one of the plurality of second terminals 7. Second shield 8 surrounds at least second specific terminal 71 among the plurality of second terminals 7. Here, second shield 8 surrounds the plurality of second specific terminals 71 and surrounds the plurality of second connection terminals 72.

The material of second shield 8 is selected from, for example, copper alloys such as phosphor bronze, corson copper, and titanium copper, stainless steel, aluminum alloy, nickel silver, and the like.

Figure 9:
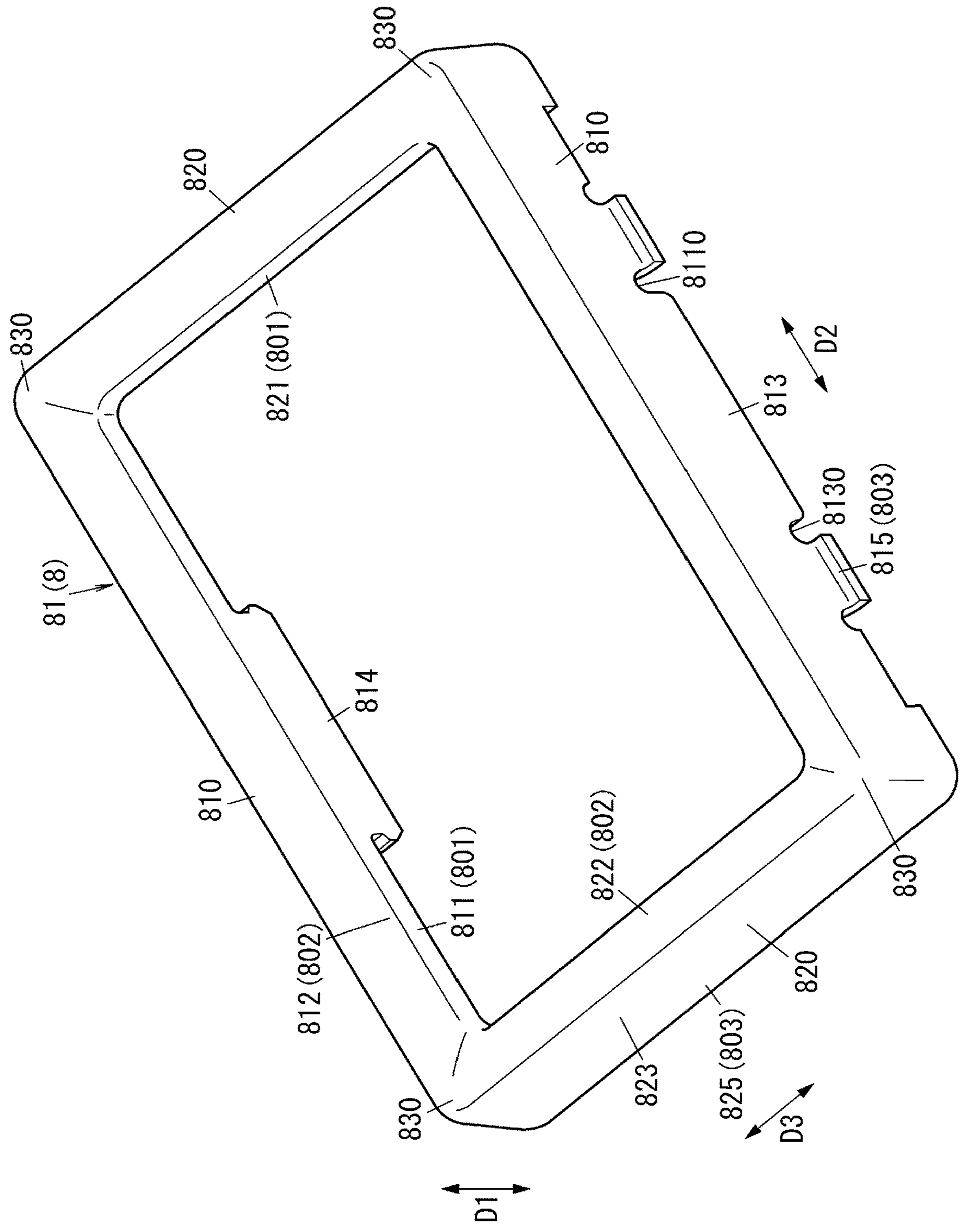
FIG. 9 is a perspective view of a second outer shield in the second connector.

As illustrated in FIGS. 8 and 9, second shield 8 includes second outer shield 81 and second inner shield 85.

As illustrated in FIG. 1, second outer shield 81 is held by second outer peripheral wall 64 of second housing 6. Second outer shield 81 is formed in a rectangular frame shape in a plan view. Second outer shield 81 surrounds the plurality of second terminals 7.

(2.2.3.1) Second Outer Shield

As illustrated in FIG. 9, second outer shield 81 includes a pair of second horizontal shields 810 and a pair of second vertical shields 820.

The pair of second horizontal shields 810 extends in second axis D2. The pair of second horizontal shields 810 covers the outer face of the side wall of second outer peripheral wall 64 along second axis D2. Each of the pair of second horizontal shields 810 is provided so as to straddle the side walls adjacent to each other on second axis D2. The pair of second horizontal shields 810 covers the upper face and the inner side face of the side wall of second outer peripheral wall 64 along second axis D2.

The pair of second vertical shields 820 extends in third axis D3. The pair of second vertical shields 820 covers the outer side face of the side wall of second outer peripheral wall 64 along third axis D3. Each of the pair of second vertical shields 820 is provided so as to straddle the side walls adjacent to each other on third axis D3. The pair of second vertical shields 820 covers the upper face and the inner side face of the side wall of second outer peripheral wall 64 along third axis D3.

The pair of second horizontal shields 810 and the pair of second vertical shields 820 are integrally formed into a rectangular frame shape in a plan view. Second outer shield 81 is formed by, for example, drawing. Second outer shield 81 is formed seamlessly. That is, in second outer shield 81, there is no opening at corner 830 where second horizontal shield 810 and second vertical shield 820 intersect.

As illustrated in FIG. 9, second horizontal shield 810 includes second side wall 811, second curved portion 812, fourth side wall 813, second extending portion 814, and joint portion 815.

Second side wall 811 has a rectangular flat plate shape having a thickness on third axis D3. Second side wall 811 extends along first axis D1 (vertical axis). Second side wall 811 extends in second axis D2.

Second curved portion 812 is connected to the upper end of second side wall 811. Second curved portion 812 is curved from the upper end of second side wall 811 to the outside of third axis D3 and is further curved downward. In this manner, second curved portion 812 is curved in an inverted U shape so as to protrude upward from first axis D1 as viewed from second axis D2. Second curved portion 812 is provided over the entire length of second horizontal shield 810 on second axis D2.

Fourth side wall 813 has a plate shape having a thickness on third axis D3. Fourth side wall 813 is connected to the lower end of second curved portion 812. Fourth side wall 813 is outside second side wall 811 on third axis D3 and faces second side wall 811. Fourth side wall 813 is provided over the entire length of second horizontal shield 810 on second axis D2.

Second extending portion 814 has a plate shape having a thickness on third axis D3. Second extending portion 814 protrudes downward from a central portion of second axis D2 at the lower end of second side wall 811. Second extending portion 814 faces fourth side wall 813 on third axis D3.

At the lower end of fourth side wall 813, rectangular notches 8130 are formed in a portion not opposed to second extending portion 814, specifically, portions on both sides of second axis D2 in a portion opposed to second extending portion 814.

Joint portion 815 is curved toward the outside of third axis D3 from the lower end face of fourth side wall 813 constituting the bottom portion of notch 8130, and extends along third axis D3. The lower face of joint portion 815 is connected to ground pattern 920 of second circuit board 92.

Second outer peripheral wall 64 of second housing 6 is disposed between second side wall 811 and fourth side wall 813.

As illustrated in FIGS. 12 and 16, second side wall 811 and second extending portion 814 of second horizontal shield 810 and fourth side wall 813 face each other outside second connection terminal 72 as viewed from third axis D3. Therefore, on third axis D3, second connection terminal 72 is doubly shielded by second side wall 811, second extending portion 814, and fourth side wall 813.

As illustrated in FIG. 9, second vertical shield 820 includes second side wall 821, second curved portion 822, fourth side wall 823, and joint portion 825.

Second side wall 821 has a rectangular flat plate shape having a thickness on second axis D2. Second side wall 821 extends along first axis D1 (vertical axis). Second side wall 821 extends in third axis D3.

Second curved portion 822 is connected to the upper end of second side wall 821. Second curved portion 822 is curved from the upper end of second side wall 821 to the outside of third axis D3 and is further curved downward. In this manner, second curved portion 822 is curved in an inverted U shape so as to protrude upward from first axis D1 as viewed from third axis D3. Second curved portion 822 is provided over the entire length of second vertical shield 820 on third axis D3.

Fourth side wall 823 has a plate shape having a thickness on second axis D2. Fourth side wall 823 is connected to the lower end of second curved portion 822. Fourth side wall 823 faces second side wall 821 on second axis D2. Fourth side wall 823 is provided over the entire length of second vertical shield 820 on third axis D3.

Here, second outer shield 81 is formed seamlessly over the entire circumference. More specifically, second side wall 811 and second side wall 821 are formed seamlessly over the entire circumference. Second curved portion 812 and second curved portion 822 are formed seamlessly over the entire circumference. Fourth side wall 813 and fourth side wall 823 are formed seamlessly over the entire circumference.

Joint portion 825 constitutes a lower end of fourth side wall 823. The lower face of joint portion 825 is connected to ground pattern 920 of second circuit board 92.

Second outer peripheral wall 64 of second housing 6 is disposed between second side wall 821 and fourth side wall 823.

As described above, second shield 8 (second horizontal shield 810, second vertical shield 820) includes second side wall 801 (811, 821) and second curved portion 802 (812, 822). Second side wall 801 (811, 821) extends in the vertical axis. Second curved portion 802 (812, 822) is connected to the lower end of second side wall 801 (811, 821). Second curved portion 802 (812, 822) is curved from a direction along the vertical axis to a direction along a horizontal axis (third axis D3, second axis D2) intersecting the vertical axis.

Second shield 8 (second horizontal shield 810, second vertical shield 820) includes second ground connection portions 803 (joint portions 815, 825) connected to ground patterns 920 of second circuit board 92.

(2.2.3.2) Second Inner Shield

Second inner shield 85 is disposed between two of the plurality of second terminals 7. Here, second inner shield 85 is disposed between second specific terminal 71 and second connection terminal 72.

As illustrated in FIG. 1, in the present embodiment, second shield 8 includes two second inner shields 85. Two second inner shields 85 are arranged side by side on second axis D2 so as to partition between one second specific terminal 71 and the plurality of (six) second connection terminals 72 and between the plurality of second connection terminals 72 and another second specific terminal 71.

As described above, since second inner shield 85 is disposed between two second specific terminals 71, it is possible to reduce the influence of noise caused by the signal current flowing through one second specific terminal 71 on the signal current flowing through the other second specific terminal 71 and second connection terminal 72.

As illustrated in FIG. 8, second inner shield 85 includes main piece 851, a pair of support pieces 852, a pair of extending pieces 853, and a pair of terminal pieces 854.

Main piece 851 has a rectangular plate shape having a thickness on second axis D2 and long on third axis D3. Each of the pair of support pieces 852 has a plate shape having a thickness on second axis D2. The pair of support pieces 852 extends upward from the upper end face of main piece 851 with a space in third axis D3. Each of the pair of extending pieces 853 has a plate shape having a thickness on first axis D1. The pair of extending pieces 853 extends from both ends of third axis D3 of main piece 851 toward the outside of second axis D2. The pair of terminal pieces 854 has a plate shape having a thickness on first axis D1. The pair of terminal pieces 854 extends from the distal ends of the pair of extending pieces 853 toward the outside of third axis D3.

Second inner shield 85 is fixed to second housing 6. Second inner shield 85 is accommodated in a groove formed in the lower face of second housing 6. The lower face of main piece 851 is exposed from the lower face of second housing 6, and the inner end faces of third axis D3 of the pair of support pieces 852 are exposed to third fitting recess 601.

As illustrated in FIG. 1, terminal piece 854 extends to the outside of second outer peripheral wall 64 of second housing 6 in a plan view. Terminal piece 854 is positioned below notch 8130 of second outer shield 81. Terminal piece 854 extends to the outside of second outer shield 81 as viewed from first axis D1. As illustrated in FIG. 13, a lower face of terminal piece 854 is connected to ground pattern 920 of second circuit board 92.

As described above, second shield 8 includes the outer shield (second outer shield 81) surrounding the plurality of second terminals 7, and the inner shield (second inner shield 85) that is disposed between the two second terminals (second specific terminal 71 and second connection terminal 72) among the plurality of second terminals 7 and is separate from the outer shield. The inner shield includes a ground connection portion (terminal piece 854) connected to ground pattern 920 of the circuit board (second circuit board 92). The ground connection portion (terminal piece 854) is disposed below the lower end of the outer shield. This facilitates connection work (For example, soldering or the like) of the inner shield (second inner shield 85) to ground patterns 920.

Here, in a state where second shield 8 is not connected to ground pattern 920 of second circuit board 92, second outer shield 81 and second inner shield 85 are separated from each other and are not electrically connected to each other. As illustrated in FIG. 14, the upper face of main piece 451 is connected to ground pattern 910 of first circuit board 91, and the lower face of main piece 851 is connected to ground pattern 920 of second circuit board 92.

(2.3) Connector Assembly

Figure 15:
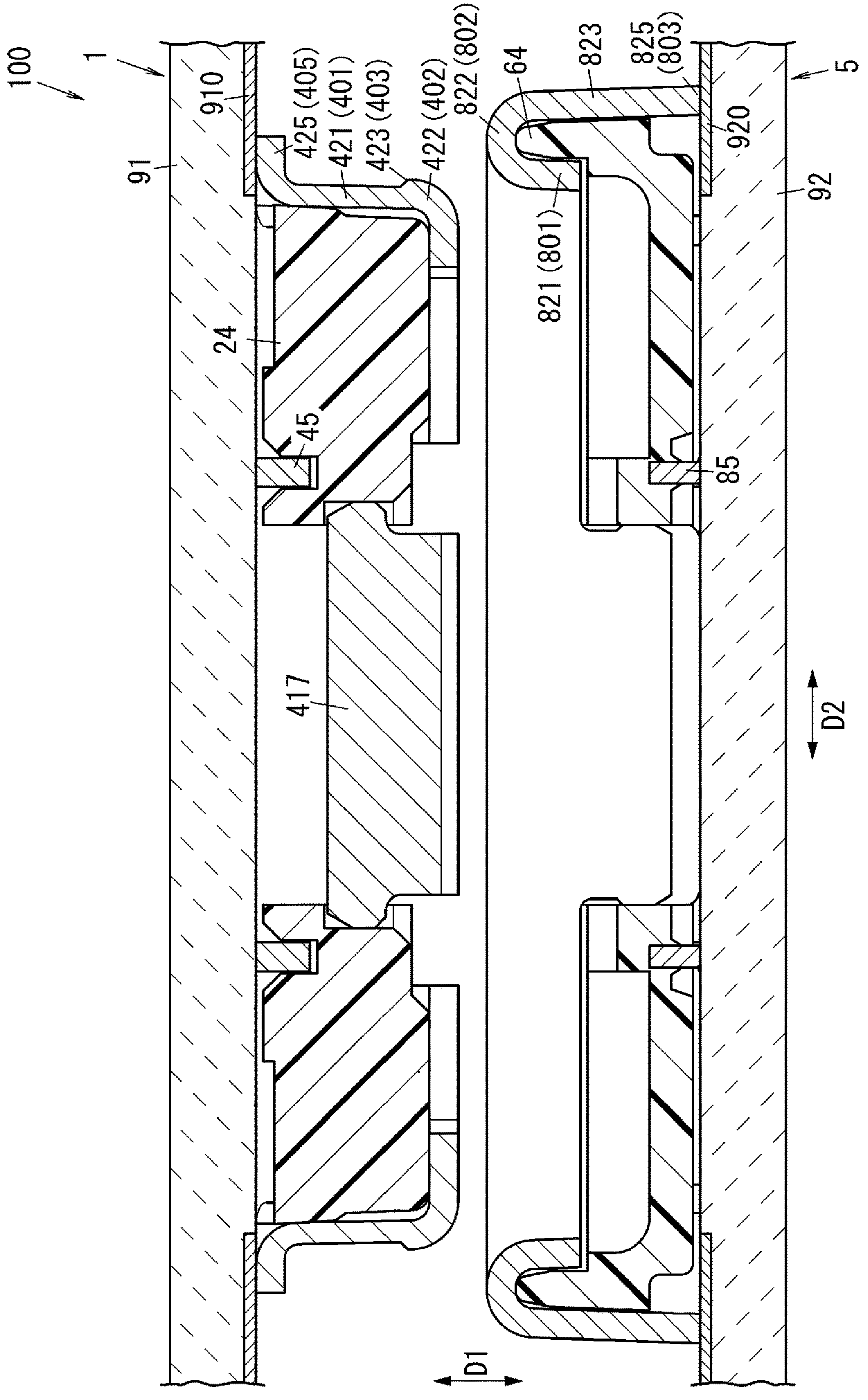
FIG. 15 is a cross-sectional view of the connector assembly taken along line IX-IX in FIG. 2 in a state where the connector assembly is disassembled.

Hereinafter, a structure of connector assembly 100 in which first connector 1 and second connector 5 are fitted will be described with reference to FIGS. 1, 2, and 10 to 16. FIG. 10 is a cross-sectional view taken along line X-X of FIG. 2. FIG. 11 is a cross-sectional view taken along line XI-XI of FIG. 2. FIG. 12 is a cross-sectional view taken along line XII-XII of FIG. 2. FIG. 13 is a cross-sectional view taken along line XIII-XIII of FIG. 2. FIG. 14 is a cross-sectional view taken along line XIV-XIV of FIG. 2. FIG. 15 is a cross-sectional view of connector assembly 100 in a portion corresponding to FIG. 11 in a state before first connector 1 and second connector 5 are fitted. FIG. 16 is a cross-sectional view of connector assembly 100 in a plane orthogonal to first axis D1.

As illustrated in FIGS. 1 and 15, first connector 1 is fitted from above second connector 5.

(2.3.1) Connection of Terminals

As illustrated in FIG. 10, in the fitted state, two first specific terminals 31 of first connector 1 are in contact with and electrically connected to two second specific terminals 71 of second connector 5. As a result, signals can be transmitted and received between first circuit board 91 on which first connector 1 is mounted and second circuit board 92 on which second connector 5 is mounted via first specific terminal 31 and second specific terminal 71.

Specifically, first specific terminal 31 is in contact with contact piece 711 of second specific terminal 71 from the outside of second axis D2 on the inner face (face intersecting the thickness axis) of second axis D2 of main piece 311. In addition, second specific terminal 71 is in contact with first specific terminal 31 on the outer face (face intersecting the thickness axis) of contact piece 711 on second axis D2. The contact pressure between main piece 311 and contact piece 711 is secured by the elastic force or the like of connecting piece 713 of second specific terminal 71.

As described above, first specific terminal 31 includes first contact portion 319 (main piece 311) provided with the contact point in contact with second specific terminal 71. First contact portion 319 is in contact with second specific terminal 71 on a face intersecting the thickness axis. The contact of first contact portion 319 is a specific portion that physically contacts second specific terminal 71 in the fitted state. In addition, second specific terminal 71 includes a second contact portion 719 (contact piece 711) provided with a contact that comes into contact with first specific terminal 31. Second contact portion 719 is in contact with first specific terminal 31 on a face intersecting the thickness axis. The contact of second contact portion 719 is a specific portion that physically contacts first specific terminal 31 in the fitted state. The contact point between first contact portion 319 and second contact portion 719 may be dotted or planar.

As illustrated in FIG. 12, in the fitted state, six first connection terminals 32 of first connector 1 are in contact with and electrically connected to six second connection terminals 72 of second connector 5. As a result, signals can be transmitted and received between first circuit board 91 on which first connector 1 is mounted and second circuit board 92 on which second connector 5 is mounted via first connection terminal 32 and second connection terminal 72.

Specifically, first connection terminal 32 is in contact with second connection terminal 72 on the inner face (face intersecting the thickness axis) of extending piece 321 on third axis D3 and on the outer face (face intersecting the thickness axis) of contact piece 322 on third axis D3. Second connection terminal 72 is in contact with first connection terminal 32 on inner face of contact piece 721 on third axis D3 (the face intersecting the thickness axis) and on the outer face of rising piece 723 on third axis D3 (the face intersecting the thickness axis).

More specifically, extending piece 321, contact piece 322, and connecting piece 323 of second connection terminal 72 are inserted between contact piece 721 and rising piece 723 of first connection terminal 32. Then, contact piece 721 comes into contact with recess 3210 of extending piece 321, and step 7230 of rising piece 723 comes into contact with recess 3220 of contact piece 322. Consequently, second connection terminal 72 comes into contact with first connection terminal 32 so as to sandwich first connection terminal 32 between contact piece 721 and rising piece 723. The contact pressure between extending piece 321 and contact piece 721 is secured by the elastic force or the like of spring piece 722 of second connection terminal 72, and the contact pressure between contact piece 322 and rising piece 723 is secured. Contact piece 721 of second connection terminal 72 constitutes a lock mechanism together with depression 3210 of first connection terminal 32. Step 7230 of second connection terminal 72 constitutes a lock mechanism together with depression 3220 of first connection terminal 32. These lock mechanisms prevent inadvertent release of the fitting between first connector 1 and second connector 5.

(2.3.2) Connection of Shield

In the fitted state, first outer shield 41 of first connector 1 is in contact with and electrically connected to second outer shield 81 of second connector 5. In the fitted state, first inner shield 45 of first connector 1 is in contact with and electrically connected to second inner shield 85 of second connector 5. As a result, the potentials of first shield 4 and second shield 8 become the same ground potential.

As illustrated in FIG. 11, in the fitted state, the lower end of second side wall 821 of second vertical shield 820 of second shield 8 is positioned above protrusion 423 of first vertical shield 420 of first shield 4. Second side wall 821 of second vertical shield 820 of second shield 8 is in contact with first side wall 421 of first vertical shield 420 of first shield 4 above protrusion 423 of first vertical shield 420 of first shield 4. As illustrated in FIG. 13, in the fitted state, the lower end of second side wall 811 of second horizontal shield 810 of second shield 8 is positioned above protrusion 413 of first horizontal shield 410 of first shield 4. Second side wall 811 of second horizontal shield 810 of second shield 8 is in contact with first side wall 411 of first horizontal shield 410 of first shield 4 above protrusion 413 of first horizontal shield 410 of first shield 4.

As described above, in the fitted state, the lower end of second side wall 801 (811, 821) is positioned above protrusion 403 (413, 423). In the fitted state, second side wall 801 is in contact with first side wall 401 (411, 421) above protrusion 403.

Here, when first connector 1 is fitted to second connector 5, first connector 1 is positioned above second connector 5 as illustrated in FIG. 15. When first connector 1 is moved downward from this state, first, protrusion 403 of first shield 4 comes into contact with second side wall 801 of second shield 8. When first connector 1 is further moved downward from there, first shield 4 is deformed so that protrusion 403 is pushed in, and when the lower end of second side wall 801 gets over protrusion 403, first shield 4 returns to the original shape. At this time, the repulsive force that first shield 4 receives from second shield 8 rapidly decreases, and a so-called click sensation is generated. Therefore, the user can easily perceive that first connector 1 and second connector 5 are fitted, and the reliability of fitting between first connector 1 and second connector 5 can be improved, and as a result, the shielding property against the electromagnetic waves can be improved. In addition, protrusion 403 makes it difficult for first connector 1 to come off from second connector 5, and can also contribute to maintaining the fitted state between first connector 1 and second connector 5. Note that the user here is not limited to a person, and may be, for example, a working machine or the like that performs work of fitting first connector 1 to second connector 5.

In addition, since second side wall 801 of second shield 8 is in contact with first side wall 401 of first shield 4 in the fitted state, it is possible to continuously form a shield on first axis D1 by first shield 4 and second shield 8, and it is possible to improve the shielding property against the electromagnetic waves.

As illustrated in FIG. 11, in the fitted state, the apex of protrusion 423 of first vertical shield 420 of first shield 4 is spaced apart from second vertical shield 820 of second shield 8 on second axis D2. As illustrated in FIG. 13, in the fitted state, the apex of protrusion 413 of first horizontal shield 410 of first shield 4 is spaced apart from second horizontal shield 810 of second shield 8 on third axis D3.

As described above, in the fitted state, the apex of protrusion 403 (413, 423) is spaced apart from second shield 8 on the horizontal axis (third axis D3, second axis D2). This makes it easy to generate a click sensation. Note that entire protrusion 403 may be spaced apart from second shield 8 on the horizontal axis.

As illustrated in FIGS. 10 and 11, in the fitted state, first side wall 421 of first vertical shield 420 of first shield 4 comes into contact with second side wall 821 of second vertical shield 820 of second shield 8. As illustrated in FIG. 16, first side wall 421 of first vertical shield 420 of first shield 4 comes into contact with second side wall 821 of second vertical shield 820 of second shield 8 along third axis D3. In particular, first vertical shield 420 is in contact with second shield 8 over third axis D3. Specifically, first side wall 421 of first vertical shield 420 of first shield 4 is in contact with second side wall 821 of second vertical shield 820 of second shield 8 over third axis D3 between openings 431. As illustrated in FIGS. 10 and 11, the lower end (edge) of second side wall 821 comes into contact with first side wall 421. In the fitted state, second side wall 821 is in linear contact with first side wall 421, and more preferably in planar contact therewith.

As illustrated in FIGS. 12 to 14, in the fitted state, first side wall 411 of first horizontal shield 410 of first shield 4 comes into contact with second side wall 811 of second horizontal shield 810 of second shield 8. As illustrated in FIG. 16, first side wall 411 of first horizontal shield 410 of first shield 4 comes into contact with second side wall 811 of second horizontal shield 810 of second shield 8 along second axis D2. In particular, first horizontal shield 410 is in contact with second shield 8 over second axis D2. Specifically, first side wall 411 of first horizontal shield 410 of first shield 4 is in contact with second side wall 811 of second horizontal shield 810 of second shield 8 over second axis D2 between openings 431. In the fitted state, second side wall 811 is in linear contact with first side wall 411, and more preferably in planar contact therewith.

As described above, in the fitted state, first side wall 401 (411, 421) of first shield 4 is in contact with second side wall 801 (811, 821) of second shield 8 across opening 431. This makes it possible to improve the shielding property against the electromagnetic waves. It is preferable that first side wall 401 and second side wall 801 be in contact with each other without a gap between openings 431 on second axis D2 or third axis D3.

As illustrated in FIGS. 10 and 11, in the fitted state, second curved portion 822 of second vertical shield 820 of second shield 8 overlaps first vertical shield 420 of first shield 4 as viewed from second axis D2. As illustrated in FIGS. 12 to 14, in the fitted state, second curved portion 812 of second horizontal shield 810 of second shield 8 overlaps first horizontal shield 410 of first shield 4 as viewed from third axis D3.

As illustrated in FIG. 11, in the fitted state, first curved portion 422 of first vertical shield 420 of first shield 4 overlaps second vertical shield 820 of second shield 8 as viewed from second axis D2. As illustrated in FIG. 13, in the fitted state, first curved portion 412 of first horizontal shield 410 of first shield 4 overlaps second horizontal shield 810 of second shield 8 as viewed from third axis D3.

As described above, in the fitted state, second curved portion 802 (812, 822) of second shield 8 overlaps first shield 4 as viewed from the horizontal axis. In the fitted state, first curved portion 402 (412, 422) of first shield 4 overlaps second shield 8 as viewed from the horizontal axis. This makes it possible to improve the shielding property against the electromagnetic waves.

As illustrated in FIG. 14, in connector assembly 100 of the present embodiment, in the fitted state, the end face along the thickness axis of first inner shield 45 and the end face along the thickness axis of second inner shield 85 are in contact with each other. This makes it possible to improve the shielding property against the electromagnetic waves.

As described above, in connector assembly 100 of the present embodiment, in the space between first circuit board 91 and second circuit board 92, all of the plurality of first terminals 3 and the plurality of second terminals 7 are surrounded by the shield including first shield 4 and second shield 8 without any gap over the entire circumference. As a result, connector assembly 100 can improve the shielding property against the electromagnetic waves. In particular, in the space between first circuit board 91 and second circuit board 92, it is preferable that first specific terminal 31 and second specific terminal 71 for transmitting a high-frequency signal are surrounded over the entire circumference by the shield constituted by first shield 4 and second shield 8 without any gap.

(2.3.3) Positional Relationship Between Terminals and Shields

As described above, first specific terminal 31 includes main piece 311 through which the signal current of the high frequency signal flows. As illustrated in FIGS. 10 and 16, in the fitted state, in first shield 4 and second shield 8, a portion where second specific terminal 71 is not disposed between main piece 311 and first shield 4 or second shield 8 and where the distance between main piece 311 and first shield 4 or second shield 8 is the shortest faces the wide face of main piece 311.

Specifically, among first outer shield 41, first inner shield 45, second outer shield 81, and second inner shield 85, a shield that is a portion other than a portion where second specific terminal 71 is disposed between itself and main piece 311 and has the shortest distance to main piece 311 is first outer shield 41. Main piece 311 faces the shortest portion of first outer shield 41 with the wide face of main piece 311.

In other words, as illustrated in FIG. 16, first shield 4 (first outer shield 41) has first opposed portion 407 opposed to first specific terminal 31 on second axis D2 in the fitted state. first specific terminal 31 includes first terminal proximity portion 300 (main piece 311). In the fitted state, first terminal proximity portion 300 is a portion where the distance between first terminal proximity portion 300 and first opposed portion 407 on second axis D2 is shorter than the distance between second specific terminal 71 and first opposed portion 407 on second axis D2. First terminal proximity portion 300 has first wide face 301 intersecting the thickness axis of first specific terminal 31 and first narrow face 302 along the thickness axis of first specific terminal 31. As illustrated in FIG. 16, a projected area obtained by projecting first wide face 301 onto a virtual plane Im1 orthogonal to second axis D2 is greater than a projected area obtained by projecting first narrow face 302 onto virtual plane Im1.

The inventors conducted the following studies. When the signal current flows through first specific terminal 31, a return current in a direction opposite to the signal current flows through a member that becomes the ground potential (first shield 4, second shield 8). The inventors have studied this return current. As a result, it has been found that the return current is generated with a certain degree of physical spread (distribution) in a portion capacitively coupled to first specific terminal 31 in the member serving as the ground potential, specifically, in a portion in the vicinity of the member (main piece 311) through which the signal current flows in the member serving as the ground potential. The inventors have found that the distribution of the return current in the member at the ground potential is affected by the distance to the member through which the signal current flows and the area opposed to the member, and the current distribution of the return current affects the noise in the connector.

In connector assembly 100 of the present embodiment, as described above, in the fitted state, the wide face (first wide face 301) of the member (main piece 311) through which the signal current flows faces the member (first outer shield 41) closest to the member (main piece 311) among the members at the ground potential. Accordingly, noise caused by the return current can be reduced.

In connector assembly 100 of the present embodiment, the width of first opposed portion 407 is greater than the width of first terminal proximity portion 300. Further, first opposed portion 407 has a flat plate shape. Further, a portion of first terminal proximity portion 300 positioned at the shortest distance with respect to first opposed portion 407 is first wide face 301. Further, first opposed portion 407 and first terminal proximity portion 300 are parallel to each other. With these configurations, noise caused by the return current can be further reduced.

As illustrated in FIG. 10, in first specific terminal 31, a first contact portion 319 is provided in first terminal proximity portion 300 (main piece 311). Further, first board-connected portion 318 is positioned above first contact portion 319 on first axis D1. With these configurations, noise caused by the return current can be further reduced.

In addition, as illustrated in FIG. 16, the minimum value of the distance between first terminal proximity portion 300 and first opposed portion 407 on second axis D2 is preferably less than or equal to the maximum value of the terminal width on the axis (third axis D3) orthogonal to first axis D1 on first wide face 301 of first terminal proximity portion 300. This makes it possible to further reduce noise caused by the return current.

As described above, second specific terminal 71 includes main piece 712 through which the signal current of the high frequency signal flows. As illustrated in FIGS. 10 and 16, in the fitted state, in first shield 4 and second shield 8, a portion where first specific terminal 31 is not disposed between main piece 712 and first shield 4 or second shield 8 and where the distance between main piece 712 and first shield 4 or second seal 8 is the shortest faces the wide face of main piece 712.

Specifically, among first outer shield 41, first inner shield 45, second outer shield 81, and second inner shield 85, a shield that is a portion other than a portion where first specific terminal 31 is disposed between itself and main piece 712 and has the shortest distance to main piece 712 is first inner shield 45 and second inner shield 85. Main piece 712 faces the shortest portions of first inner shield 45 and second inner shield 85 with the wide face of main piece 712.

In other words, as illustrated in FIG. 16, one of first shield 4 and second shield 8 has second opposed portion 408 opposed to second specific terminal 71 on second axis D2 in the fitted state. More specifically, one of first inner shield 45 and second inner shield 85 has second opposed portion 408 opposed to second specific terminal 71 on second axis D2 in the fitted state. In the present embodiment, first inner shield 45 includes second opposed portion 408. Second specific terminal 71 includes second terminal proximity portion 700 (main piece 712). In the fitted state, second terminal proximity portion 700 is a portion where the distance between second terminal proximity portion 700 and second opposed portion 408 on second axis D2 is shorter than the distance between first specific terminal 31 and second opposed portion 408 on second axis D2. Second terminal proximity portion 700 has second wide face 701 intersecting the thickness axis of second specific terminal 71 and second narrow face 702 along the thickness axis of second specific terminal 71. As illustrated in FIG. 16, a projected area obtained by projecting second wide face 701 onto a virtual plane Im1 orthogonal to second axis D2 is greater than a projected area obtained by projecting second narrow face 702 onto virtual plane Im1.

In addition, the other of first shield 4 and second shield 8 has third opposed portion 804 that faces second specific terminal 71 on second axis D2 and is in contact with second opposed portion 408 in the fitted state. In the present embodiment, second inner shield 85 of second shield 8 has third opposed portion 804 that faces second specific terminal 71 on second axis D2 and is in contact with second opposed portion 408 in the fitted state. In the fitted state, third opposed portion 804 is on the same side as second opposed portion 408 with respect to second specific terminal 71 on second axis D2.

When the signal current flows through second specific terminal 71, a return current in a direction opposite to the signal current flows through a member that becomes the ground potential (first shield 4, second shield 8). In connector assembly 100 of the present embodiment, as described above, in the fitted state, the wide face (second wide face 701) of the member (main piece 712) through which the signal current flows is made to face the member (first inner shield 45, second inner shield 85) closest to the member (main piece 712) among the members at the ground potential. Accordingly, noise caused by the return current can be reduced.

In connector assembly 100 of the present embodiment, the widths of second opposed portion 408 and third opposed portion 804 are greater than the width of second terminal proximity portion 700 (member through which signal current flows). Further, second opposed portion 408 and third opposed portion 804 have a flat plate shape. Further, second terminal proximity portion 700 positioned at the shortest distance with respect to second opposed portion 408 is second wide face 701. Further, second opposed portion 408 and second terminal proximity portion 700 are parallel to each other, and third opposed portion 804 and second terminal proximity portion 700 are parallel to each other. With these configurations, noise caused by the return current can be further reduced.

As shown in FIG. 10, second specific terminal 71 has a connecting portion (connecting piece 713) that is curved in a U shape and connects second contact portion 719 and second terminal proximity portion 700 (main piece 712). Further, second board-connected portion 718 is positioned below first contact portion 319 on first axis D1, and is positioned below second contact portion 719 on first axis D1. With these configurations, noise caused by the return current can be further reduced.

In addition, as illustrated in FIG. 16, the minimum value of the distance between second terminal proximity portion 700 and second opposed portion 408 on second axis D2 is preferably less than or equal to the maximum value of the terminal width on the axis (third axis D3) orthogonal to first axis D1 on second wide face 701 of second terminal proximity portion 700. This makes it possible to further reduce noise caused by the return current.

As described above, first side wall 421 of first vertical shield 420 of first shield 4 is in contact with second side wall 821 of second vertical shield 820 of second shield 8 along third axis D3 (see FIG. 16). Further, joint portion 425 (first ground connection portion 405) of first vertical shield 420 of first shield 4 is formed along third axis D3, and joint portion 825 (second ground connection portion 803) of second vertical shield 820 of second shield 8 is formed along third axis D3 (see FIG. 10).

In other words, first shield 4 has contact portion 409 (first side wall 421) that extends on third axis D3 intersecting both first axis D1 and second axis D2 and is in contact with second shield 8. Each of first ground connection portion 405 and second ground connection portion 803 is formed along third axis D3. The dimension of third axis D3 of contact portion 409 is greater than the dimension of third axis D3 of first terminal proximity portion 300 projected on virtual plane Im1. More specifically, contact portion 409 is in contact with second shield 8 in a region including the entire third axis D3 of first terminal proximity portion 300 as viewed from second axis D2, and is preferably in contact with second shield 8 over the entire length of third axis D3 (see FIG. 16). In addition, first ground connection portion 405 is in contact with ground pattern 910 of first circuit board 91 in a region including the entire third axis D3 of first terminal proximity portion 300 as viewed from second axis D2, and is preferably in contact with ground pattern 910 over the entire length of third axis D3.

In order to reduce the noise caused by the return current, the contact portion between first shield 4 and second shield 8 is preferably continuous.

As described above, since contact portion 409 of first shield 4 is in contact with second shield 8 along third axis D3, a portion that becomes the ground potential can be opposed to first terminal proximity portion 300 without forming a discontinuous portion between first shield 4 and second shield 8. Therefore, noise caused by the return current can be reduced.

As described above, in connector assembly 100 of the present embodiment, first wide face 301 of first terminal proximity portion 300 faces first opposed portion 407. Accordingly, noise caused by the return current can be reduced. In connector assembly 100 of the present embodiment, first shield 4 and second shield 8 are further brought into continuous contact with each other at first opposed portion 407. Accordingly, noise caused by the return current can be reduced.

In order to detach first connector 1 from second connector 5 from the fitted state, first connector 1 may be pulled upward with a force greater than the force for maintaining the fitted state by the lock mechanism.

(3) Modifications

The exemplary embodiment of the present disclosure is not limited to the above exemplary embodiment. The above exemplary embodiment can be variously changed in accordance with design and the like as long as the object of the present disclosure can be achieved. Hereinafter, modifications of the above-described exemplary embodiment will be listed. The modifications to be described below can be applied in appropriate combination.

(3.1) First Modification

Connector assembly 100 of the present modification is different from connector assembly 100 of the above-described embodiment in the configuration of first shield 4 of first connector 1. In addition, connector assembly 100 of the present modification is different from connector assembly 100 of the above-described embodiment in the configuration of first housing 2 of first connector 1 (header). In addition, connector assembly 100 of the present modification is different from connector assembly 100 of the above-described embodiment in the configuration of second shield 8 of second connector 5 (socket). In connector assembly 100 of the present modification, the same reference numerals are given to the same configurations as those of connector assembly 100 described above, and the description thereof is appropriately omitted.

Figure 17:
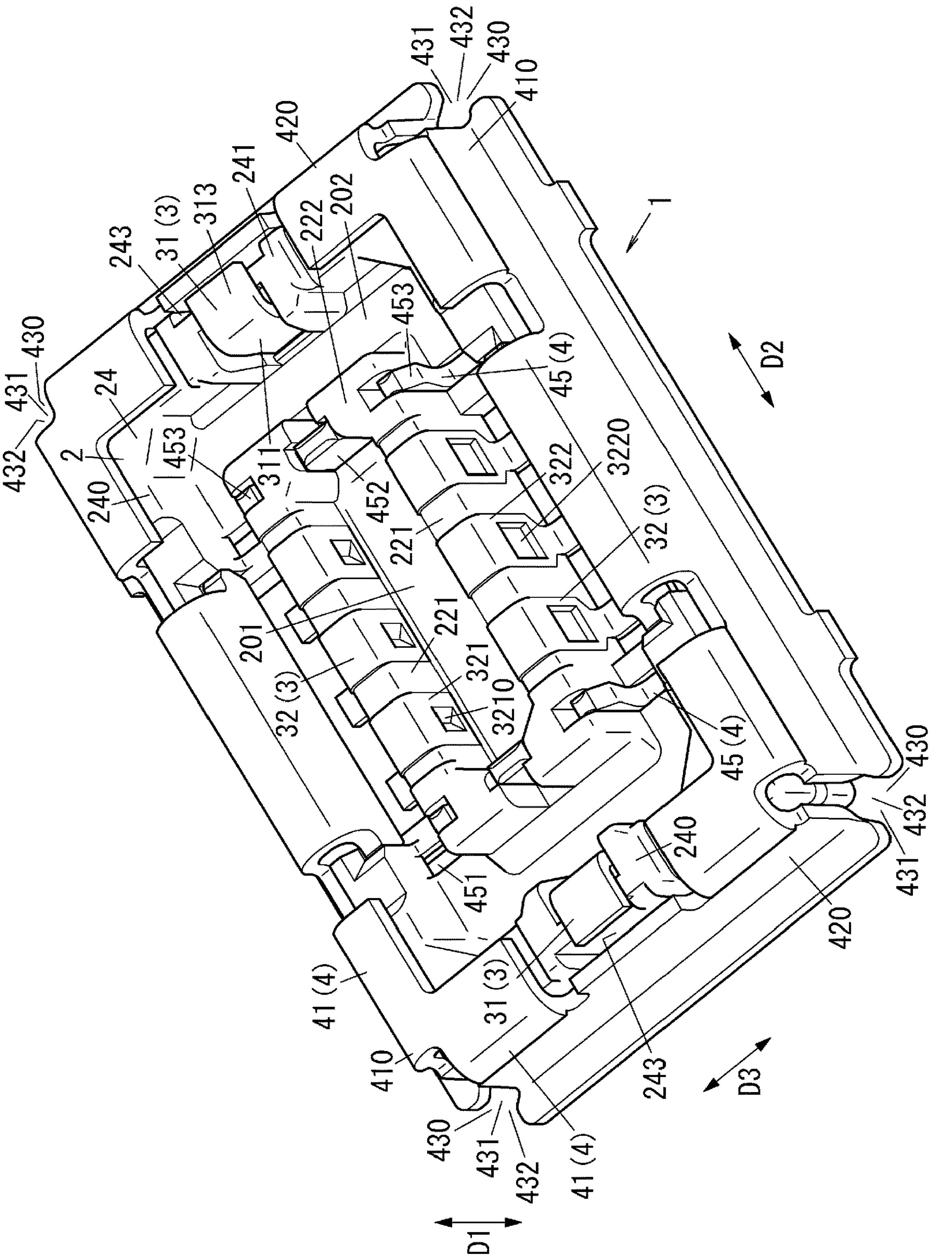
FIG. 17 is a perspective view of a second connector of a connector assembly of a first modification.
Figure 18:
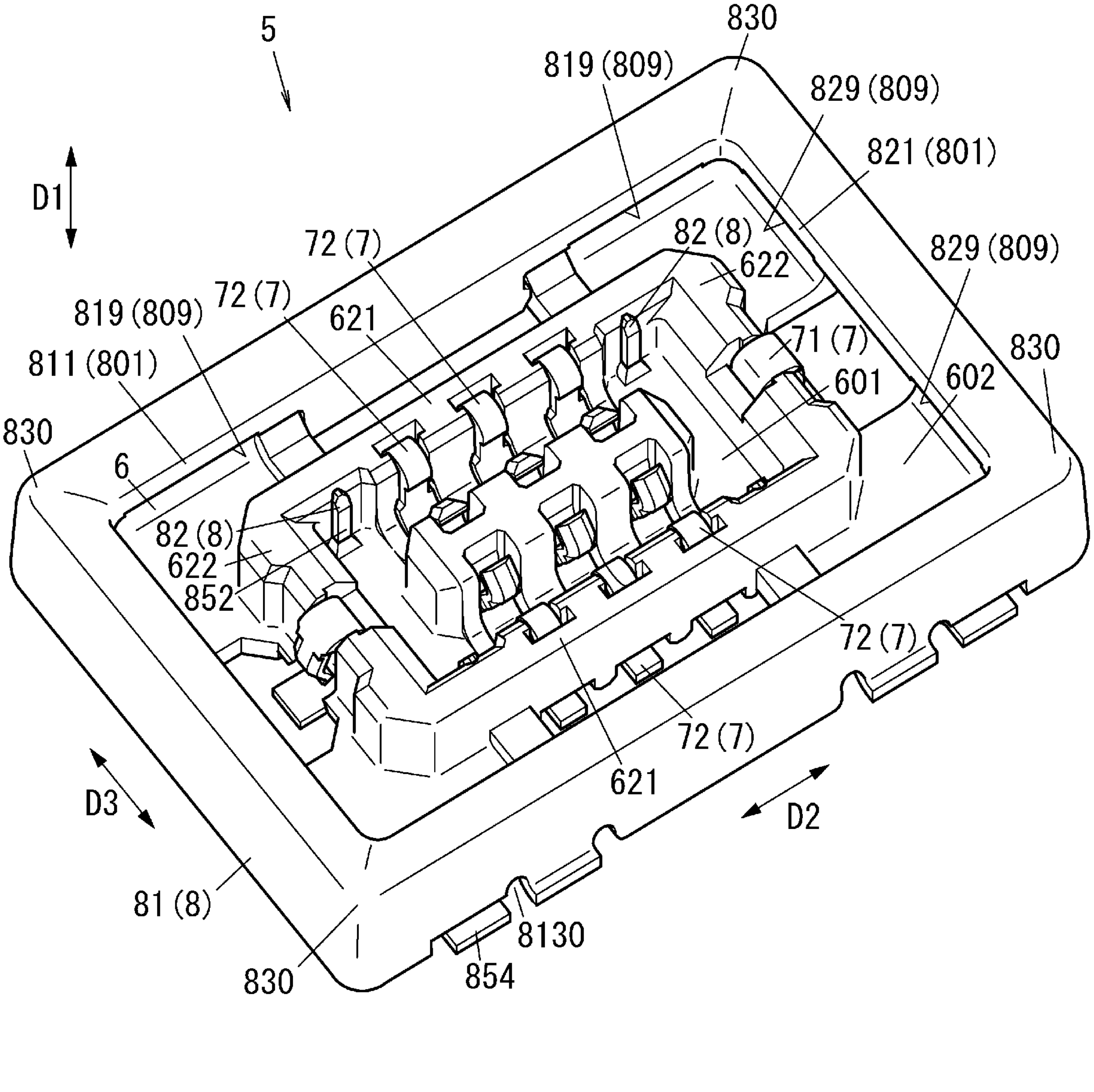
FIG. 18 is a perspective view of a first connector of the connector assembly.
Figure 19:
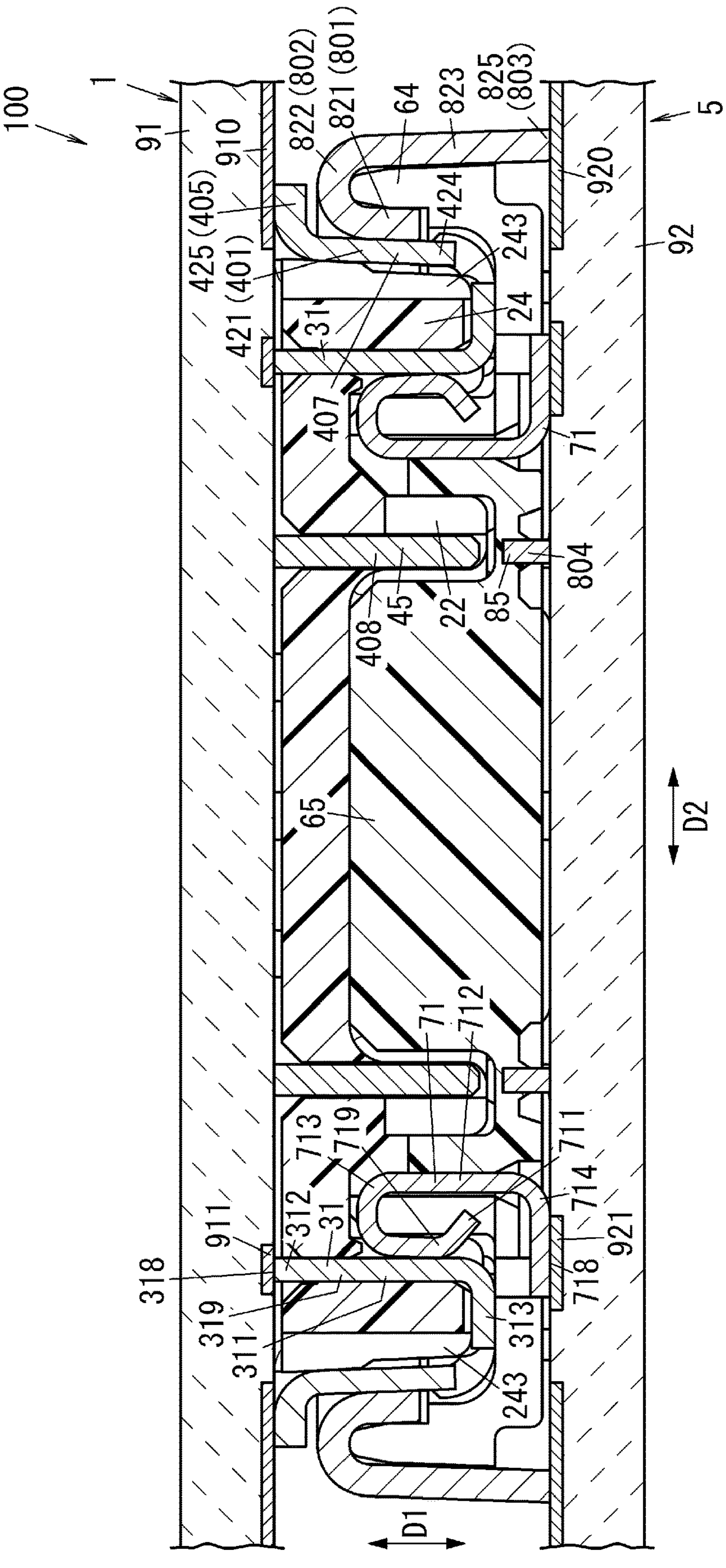
FIG. 19 is a cross-sectional view of the connector assembly in the fitted state.
Figure 20A:
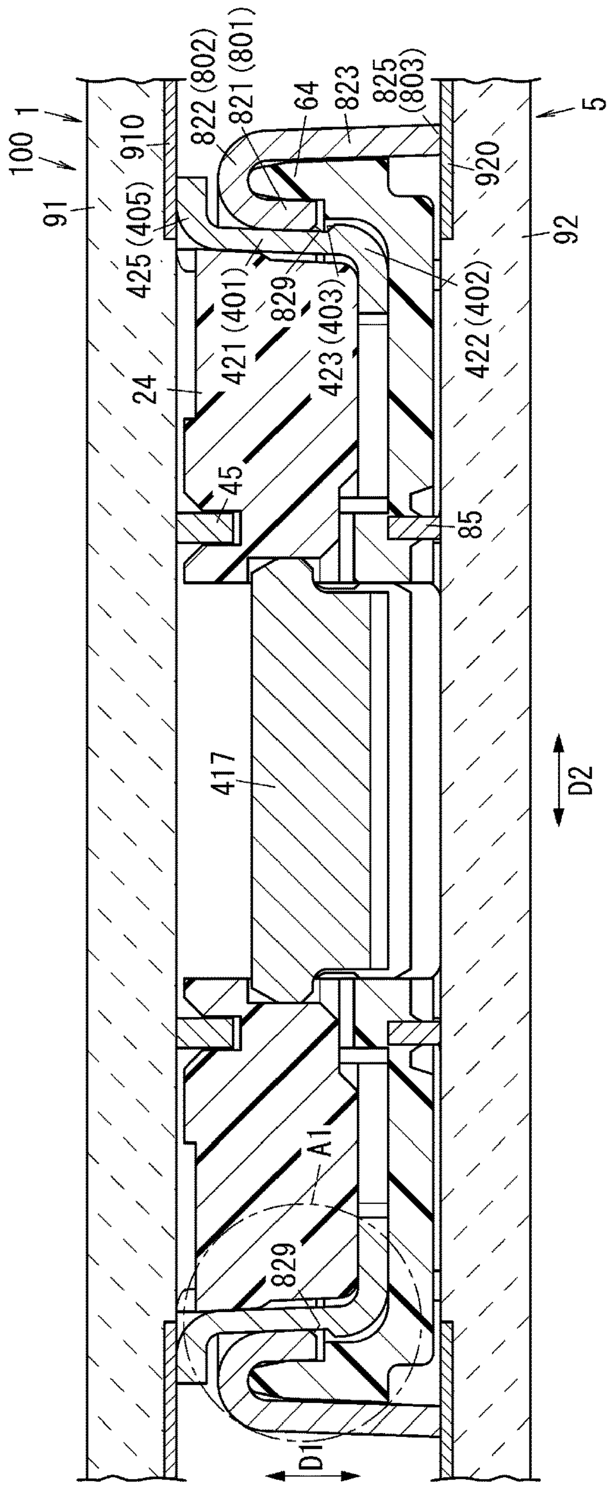
FIG. 20A is a cross-sectional view of the connector assembly in the fitted state.
Figure 20B:
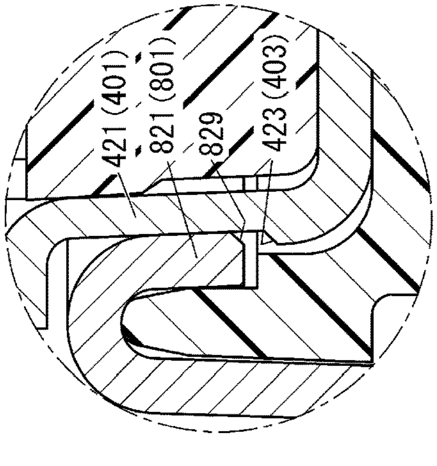
FIG. 20B is an enlarged view of a section A1 of FIG. 20A.
Figure 21A:
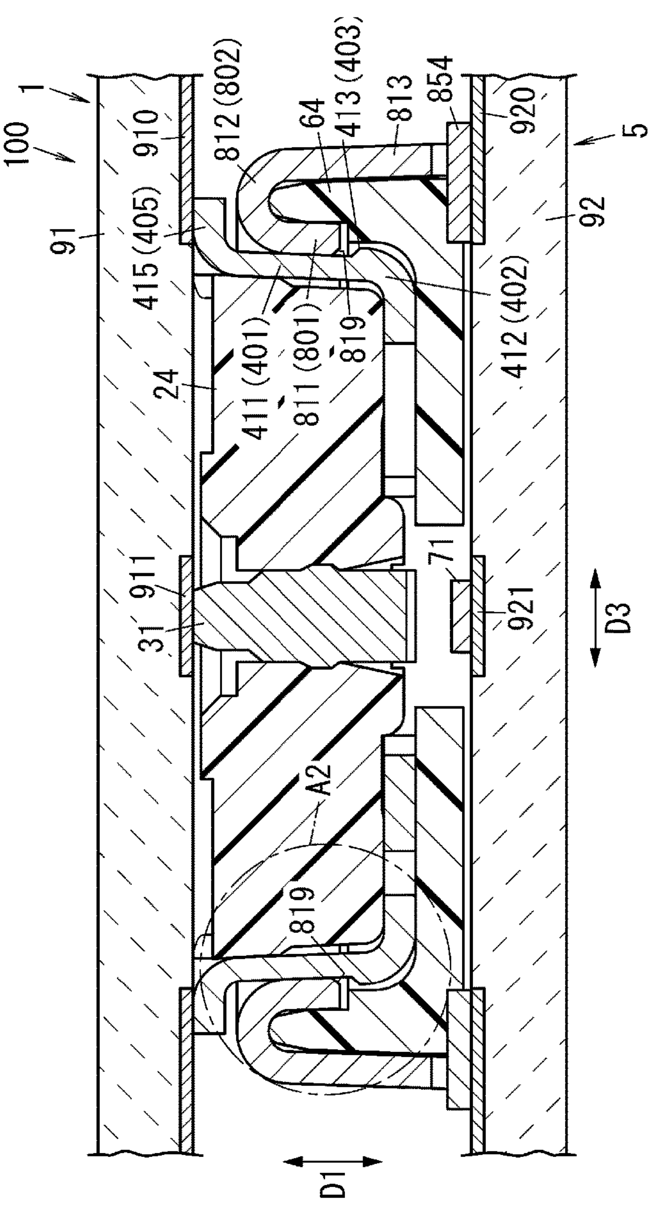
FIG. 21A is a cross-sectional view of the connector assembly in the fitted state.
Figure 21B:
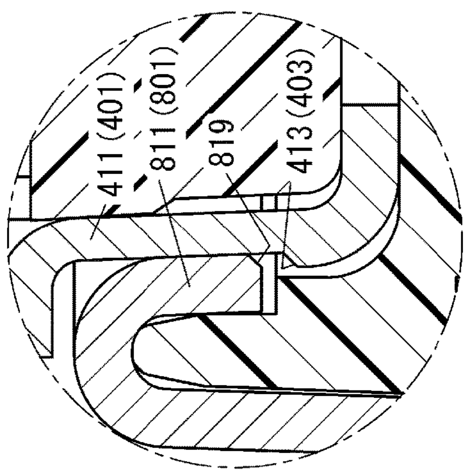
FIG. 21B is an enlarged view of a section A2 of FIG. 21A.

Hereinafter, a structure of connector assembly 100 of the present modification will be described with reference to FIGS. 17 to 21B. FIG. 17 is a perspective view of first connector 1 as viewed from below the vertical axis. FIG. 18 is a perspective view of second connector 5 as viewed from above the vertical axis. FIG. 19 is a cross-sectional view of connector assembly 100 of the present modification taken along line X-X of FIG. 2 described in the above-described embodiment. FIG. 20A is a cross-sectional view of connector assembly 100 of the present modification taken along line XI-XI of FIG. 2 described in the above-described embodiment. FIG. 20B is an enlarged view of a section A1 of FIG. 20A. FIG. 21A is a cross-sectional view of connector assembly 100 of the present modification taken along line XIII-XIII of FIG. 2 described in the above-described embodiment. FIG. 21B is an enlarged view of a section A2 of FIG. 21A.

As illustrated in FIG. 17, in first connector 1 of connector assembly 100 of the present modification, first outer shield 41 is formed of one member. That is, in first outer shield 41, both ends of first horizontal shield 410 of one of the pair of first horizontal shields 410 on second axis D2 are respectively connected to one ends of the pair of first vertical shields 420 on third axis D3. Further, both ends of the other one of first horizontal shield 410 of the pair of first horizontal shields 410 on second axis D2 are respectively connected to the other ends of the pair of first vertical shields 420 on third axis D3. Thus, first outer shield 41 is formed in a frame shape (rectangular frame shape) when viewed from first axis D1.

First horizontal shield 410 and first vertical shield 420 are connected to each other at the end faces of the lower walls, and the end faces of the side walls along first axis D1 are separated from each other. Specifically, first outer shield 41 has notch 432 extending along opening 431, more specifically, first axis D1 at a corner 430 where first horizontal shield 410 and first vertical shield 420 intersect. First outer shield 41 has four openings 431 (four notches 432 extending along first axis D1) formed in four corners 430.

That is, in connector assembly 100 of the present modification, first shield 4 includes a pair of horizontal shields (first horizontal shield 410) spaced apart from each other on third axis D3 and a pair of vertical shields (first vertical shield 420) spaced apart from each other on second axis D2. Both ends of one horizontal shield (first horizontal shield 410) of the pair of horizontal shields (first horizontal shield 410) on second axis D2 are respectively connected to one ends of the pair of vertical shields (first vertical shields 420) on third axis (D3). Both ends of the other horizontal shield (first horizontal shield 410) of the pair of horizontal shields (first horizontal shield 410) on second axis D2 are respectively connected to the other ends of the pair of vertical shields (first vertical shields 420) on third axis D3.

As described above, when first outer shield 41 is connected in a frame shape, it is possible to improve the stability of holding first outer shield 41 by first housing 2 when first connector 1 is fitted to second connector 5 (see FIG. 15). That is, when first connector 1 is fitted to second connector 5, if protrusion 423 of first vertical shield 420 of first outer shield 41 comes into contact with second side wall 821 of second shield 8 and is pushed inward, first vertical shield 420 tends to bend so as to rotate inward. However, since first outer shield 41 is connected in a frame shape, the deflection of first vertical shield 420 is suppressed by the pair of first horizontal shields 410 connected to both ends of first vertical shield 420. Similarly, when first connector 1 is fitted to second connector 5, if protrusion 413 of first horizontal shield 410 of first outer shield 41 comes into contact with second side wall 811 of second shield 8 and is pushed inward, first horizontal shield 410 tends to bend so as to rotate inward. However, since first outer shield 41 is connected in a frame shape, the deflection of first horizontal shield 410 is suppressed by the pair of first vertical shields 420 connected to both ends of first horizontal shield 410.

In connector assembly 100 of the present modification, the stability of holding first outer shield 41 by first housing 2 is improved, so that the reliability of the connection between first shield 4 and second shield 8 can be improved. This makes it possible to improve the shielding property against the electromagnetic waves.

As illustrated in FIG. 17, in first connector 1 of connector assembly 100 of the present modification, recess 243 is formed on first vertical outer wall 241 of first outer wall 240 of first housing 2 on the opposite side of the recess (outside second axis D2) in which first specific terminal 31 is accommodated. Recess 243 is formed so as to be recessed inward on the outer face of first vertical outer wall 241 on second axis D2. As illustrated in FIG. 19, recess 243 extends along first axis D1.

Since first housing 2 has recess 243, it is possible to further reduce noise caused by the return current.

As illustrated in FIGS. 18 and 20A to 21B, in second connector 5 of connector assembly 100 of the present modification, the lower end portion of the face of second side wall 801 (811, 821) of second shield 8 (second outer shield 81) opposed to first side wall 401 (411, 421) of first connector 1 is chamfered. That is, second shield 8 (second outer shield 81) of second connector 5 has chamfered portion 809 (819, 829) obtained by chamfering a part of a lower end portion at a lower end portion of a face (inner face) of second side wall 801 (811, 821) opposed to first side wall 401 (411, 421).

More specifically, each of the pair of second vertical shields 820 of second outer shield 81 has two chamfered portions 829 at the lower end portion of second side wall 821. In each of second vertical shields 820, two chamfered portions 829 are formed around two corners 830 intersecting the pair of second horizontal shields 810 connected to second vertical shield 820. Chamfered portion 829 is formed at a position corresponding to protrusion 423 of first vertical shield 420 of first outer shield 41 of first connector 1.

Each of the pair of second horizontal shields 810 of second outer shield 81 has two chamfered portions 819 at the lower end of second side wall 811. In each of second horizontal shields 810, two chamfered portions 819 are formed around two corners 830 intersecting the pair of second vertical shields 820 connected to second horizontal shield 810. Chamfered portion 819 is formed at a position corresponding to protrusion 413 of first horizontal shield 410 of first outer shield 41 of first connector 1.

In a case where first connector 1 is fitted to second connector 5, when first connector 1 is moved downward from a state where first connector 1 is positioned above second connector 5 (see FIG. 15), protrusion 403 (413, 423) of first shield 4 comes into contact with second side wall 801 (811, 821) of second shield 8. When first connector 1 is further moved downward from there, first shield 4 is deformed such that protrusion 403 (413, 423) is pushed in. Then, when the lower end of second side wall 801 (811, 821) passes over protrusion 403 (413, 423), first shield 4 returns to the original shape, whereby first connector 1 is fitted to second connector 5. Here, when second side wall 801 (811, 821) has chamfered portion 809 (819, 829) as in the present modification, the lower end of second side wall 801 (811, 821) easily gets over protrusion 403 (413, 423), and first connector 1 can be fitted to second connector 5 only by applying a relatively small force. Even when first connector 1 is detached from second connector 5, first connector 1 can be detached from second connector 5 only by applying a relatively small force. This improves the handleability of connector assembly 100.

As illustrated in FIGS. 20B and 21B, the shape of chamfered portion 809 (819, 829) is, for example, a C-chamfered shape (a shape in which a corner is obliquely lowered by 45°). However, the present invention is not limited to this, and the shape of chamfered portion 809 may be a slope shape in which the corner is dropped at an angle other than 45°, or may be a round chamfered shape (curved face shape). Whether or not to form chamfered portion 809 and the shape of chamfered portion 809 may be set based on the uneasiness and the easiness of detachment of first connector 1 from second connector 5, which are necessary in actual use of connector assembly 100.

Note that first connector 1 of the above-described embodiment and second connector 5 of the present modification may constitute connector assembly 100, and first connector 1 of the present modification and second connector 5 of the above-described embodiment may constitute connector assembly 100.

(3.2) Other Modifications

In one modification, first terminal proximity portion 300 may not be parallel to first opposed portion 407, and the projected area of first wide face 301 on virtual plane Im1 may be greater than the projected area of first narrow face 302 on virtual plane Im1.

In one modification, second terminal proximity portion 700 may not be parallel to second opposed portion 408, and may not be parallel to third opposed portion 804.

In one modification, first terminal proximity portion 300 may not have a flat plate shape, and may have, for example, a V shape, a U shape, or the like when viewed from the first axis.

(4) Aspects

The following aspects are disclosed based on the above-described exemplary embodiment, modifications, and the like.

Connector assembly (100) according to a first aspect includes first connector (1) and second connector (5) into which first connector (1) is fitted from above first axis (D1) as a vertical axis. The first connector (1) includes a plurality of first terminals (3), first shield (4) having first ground connection portion (405) connected to ground pattern (910) of first circuit board (91), and first housing (2) that holds the plurality of first terminals (3) and first shield (4). Second connector (5) includes: a plurality of second terminals (7) that each come into contact with a corresponding one of a plurality of first terminals (3) in the fitted state in which first connector (1) and second connector (5) are fitted to each other; second shield (8) having second ground connection portion (803) connected to ground pattern (920) of second circuit board (92); and second housing (6) that holds the plurality of second terminals (7) and second shield (8). The plurality of first terminals (3) include first specific terminal (31). The plurality of second terminals (7) include second specific terminal (71). In the fitted state, first specific terminal (31) is in contact with and electrically connected to the second specific terminal (71). The first shield (4) has first opposed portion (407) opposed to first specific terminal (31) on second axis (D2) orthogonal to first axis (D1) in the fitted state. The first specific terminal (31) includes first terminal proximity portion (300) in which a distance to first opposed portion (407) on second axis (D2) is smaller than a distance between the second specific terminal (71) and the first opposed portion (407) on second axis (D2) in the fitted state. First terminal proximity portion (300) has first wide face (301) intersecting the thickness axis of first specific terminal (31) and first narrow face (302) along the thickness axis of first specific terminal (31). A projected area obtained by projecting the first wide face (301) onto virtual plane (Im1) orthogonal to second axis (D2) is greater than a projected area obtained by projecting the first narrow face (302) onto the virtual plane (Im1).

According to this aspect, in the fitted state, the wide face (first wide face 301) of the member (first specific terminal 31) through which the signal current flows is opposed to the member (first outer shield 41) closest to the member (first specific terminal 31) among the members at the ground potential. Accordingly, noise caused by the return current can be reduced.

In connector assembly (100) of the second aspect, in the first aspect, one of first shield (4) and second shield (8) has second opposed portion (408) opposed to the second specific terminal (71) on second axis (D2) in the fitted state. The second specific terminal (71) includes second terminal proximity portion (700) in which a distance to the second opposed portion (408) on second axis (D2) is smaller than a distance between first specific terminal (31) and the second opposed portion (408) on second axis (D2) in the fitted state. The second terminal proximity portion (700) has second wide face (701) intersecting the thickness axis of the second specific terminal (71) and second narrow face (702) along the thickness axis of the second specific terminal (71). A projected area obtained by projecting the second wide face (701) onto the virtual plane (Im1) is greater than a projected area obtained by projecting the second narrow face (702) onto the virtual plane (Im1).

According to this aspect, noise caused by the return current can be reduced.

In connector assembly (100) of the third aspect, in the second aspect, the other of first shield (4) and second shield (8) has a third opposed portion (804) opposed to the second specific terminal (71) on second axis (D2) and in contact with second opposed portion (408) in the fitted state. The third opposed portion (804) is positioned on the same side as the second opposed portion (408) with respect to the second specific terminal (71) on second axis (D2) in the fitted state.

According to this aspect, noise caused by the return current can be reduced.

In connector assembly (100) of the fourth aspect, in the second or third aspect, the first terminal proximity portion (300) positioned at the shortest distance with respect to the first opposed portion (407) is the first wide face (301). The second terminal proximity portion (700) positioned at the closest position with respect to second opposed portion (408) is second wide face (701).

According to this aspect, noise caused by the return current can be reduced.

In connector assembly (100) of the fifth aspect, in any one of the first to fourth aspects, first shield (4) has contact portion (409) extending on third axis (D3) intersecting both first axis (D1) and second axis (D2) and in contact with second shield (8). Each of the first ground connection portion (405) and the second ground connection portion (803) is formed along third axis (D3).

According to this aspect, noise caused by the return current can be reduced.

In connector assembly (100) of the sixth aspect, in the fifth aspect, the dimension of third axis (D3) of the contact portion (409) is greater than the dimension of third axis (D3) of the first terminal proximity portion (300) projected onto the virtual plane (Im1).

According to this aspect, noise caused by the return current can be reduced.

In connector assembly (100) of the seventh aspect, in any one of the first to sixth aspects, first shield (4) includes first outer shield (41) surrounding the plurality of first terminals (3) and first inner shield (45) disposed between two of the plurality of first terminals (3). The first outer shield (41) has first opposed portion (407).

According to this aspect, noise caused by the return current can be reduced.

In connector assembly (100) of the eighth aspect, in the seventh aspect, second shield (8) includes second outer shield (81) surrounding the plurality of second terminals (7) and second inner shield (85) disposed between two of the plurality of second terminals (7). One of the first inner shield (45) and the second inner shield (85) has second opposed portion (408) opposed to the second specific terminal (71) on second axis (D2) in the fitted state. The second specific terminal (71) includes second terminal proximity portion (700) in which a distance to the second opposed portion (408) on second axis (D2) is smaller than a distance between first specific terminal (31) and the second opposed portion (408) on second axis (D2) in the fitted state.

According to this aspect, noise caused by the return current can be reduced.

In connector assembly (100) of the ninth aspect, in the eighth aspect, the first inner shield (45) has a second opposed portion (408). The second inner shield (85) has third opposed portion (804) opposed to the second specific terminal (71) on second axis (D2) and is in contact with the second opposed portion (408) in the fitted state. The third opposed portion (804) is positioned on the same side as the second opposed portion (408) with respect to the second specific terminal (71) on second axis (D2) in the fitted state.

According to this aspect, noise caused by the return current can be reduced.

In connector assembly (100) of the 10th aspect, in the eighth or ninth aspect, in the fitted state, the end face along the thickness axis of the first inner shield (45) and the end face along the thickness axis of the second inner shield (85) are in contact with each other.

According to this aspect, the length of the path through which the return current flows can be shortened.

In connector assembly (100) of the 11th aspect, in any one of the first to 10th aspects, first specific terminal (31) includes first board-connected portion (318) connected to the conductor pattern of the first circuit board (91), and first contact portion (319) provided with a contact in contact with the second specific terminal (71). The second specific terminal (71) includes second board-connected portion (718) connected to the conductor pattern of the second circuit board (92), and second contact portion (719) provided with a contact in contact with first specific terminal (31). One of the first board-connected portion (318) and the second board-connected portion (718) has an end face along a thickness axis overlapping a corresponding circuit board. The other of the first board-connected portion (318) and the second board-connected portion (718) has a face intersecting the thickness axis overlapping the corresponding circuit board.

According to this aspect, noise caused by the return current can be reduced.

In connector assembly (100) according to the 12th aspect, in the 11th aspect, in the fitted state, the first board-connected portion (318) is positioned above the first contact portion (319) on first axis (D1), and the second board-connected portion (718) is positioned below the first contact portion (319) on first axis (D1).

According to this aspect, noise caused by the return current can be reduced.

In connector assembly (100) of the 13th aspect, in any one of the first to sixth aspects, first shield (4) has first outer shield (41) surrounding the plurality of first terminals (3). The first opposed portion (407) is provided on first outer shield (41). The minimum value of the distance between the first terminal proximity portion (300) and the first opposed portion (407) on second axis (D2) is less than or equal to the maximum value of the terminal width on the axis (third axis D3) orthogonal to first axis (D1) on the first wide face (301) of the first terminal proximity portion (300).

According to this aspect, noise caused by the return current can be reduced.

In connector assembly (100) of the 14th aspect, in the second aspect, the minimum value of the distance between the second terminal proximity portion (700) and the second opposed portion (408) on second axis (D2) is less than or equal to the maximum value of the terminal widths of the axis (third axis D3) orthogonal to first axis (D1) on the second wide face (701) of the second terminal proximity portion (700).

According to this aspect, noise caused by the return current can be reduced.

REFERENCE MARKS IN THE DRAWINGS

100 connector assembly
1 first connector
2 first housing
3 first terminal
300 first terminal proximity portion
301 first wide face
302 first narrow face
31 first specific terminal
318 first board-connected portion
319 first contact portion
4 first shield
405 first ground connection portion
407 first opposed portion
408 second opposed portion
41 first outer shield
45 first inner shield
5 second connector
6 second housing
7 second terminal
700 second terminal proximity portion
701 second wide face
702 second narrow face
71 second specific terminal
718 second board-connected portion
719 second contact portion
8 second shield
803 second ground connection portion
804 third opposed portion
81 second outer shield
85 second inner shield
91 first circuit board
910 ground pattern

92 second circuit board
920 ground pattern
D1 first axis
D2 second axis
D3 third axis
Im1 virtual plane

The invention claimed is:

1. A connector assembly comprising:

a first connector; and a second connector to which the first connector is fitted from above, wherein the first connector includes a plurality of first terminals, a first shield having a first ground connection portion connected to a ground pattern of a first circuit board, and a first housing that holds the plurality of first terminals and the first shield, the second connector includes a plurality of second terminals each coming into contact with a corresponding one of the plurality of first terminals in a fitted state in which the first connector and the second connector are fitted to each other, a second shield having a second ground connection portion connected to a ground pattern of a second circuit board, and a second housing that holds the plurality of second terminals and the second shield, the plurality of first terminals include a first specific terminal, the plurality of second terminals include a second specific terminal, in the fitted state, the first specific terminal is in contact with and electrically connected to the second specific terminal, the first shield has a first opposed portion opposed to the first specific terminal on a second axis orthogonal to the first axis in the fitted state, the first specific terminal includes a first terminal proximity portion in which a distance to the first opposed portion on the second axis is smaller than a distance between the second specific terminal and the first opposed portion on the second axis in the fitted state, the first terminal proximity portion has a first wide face intersecting a thickness axis of the first specific terminal and a first narrow face along the thickness axis of the first specific terminal, and a projected area obtained by projecting the first wide face onto a virtual plane orthogonal to the second axis is greater than a projected area obtained by projecting the first narrow face onto the virtual plane.

2. The connector assembly according to claim 1, wherein one of the first shield and the second shield has a second opposed portion opposed to the second specific terminal on the second axis in the fitted state, the second specific terminal includes a second terminal proximity portion in which a distance to the second opposed portion on the second axis is smaller than a distance between the first specific terminal and the second opposed portion on the second axis in the fitted state, the second terminal proximity portion has a second wide face intersecting a thickness axis of the second specific terminal and a second narrow face along the thickness axis of the second specific terminal, and a projected area obtained by projecting the second wide face onto the virtual plane is greater than a projected area obtained by projecting the second narrow face onto the virtual plane.

3. The connector assembly according to claim 2, wherein another of the first shield and the second shield has a third opposed portion opposed to the second specific terminal on the second axis and in contact with the second opposed portion in the fitted state, and the third opposed portion is on a same side as the second opposed portion with respect to the second specific terminal on the second axis in the fitted state.

4. The connector assembly according to claim 2, wherein the first terminal proximity portion positioned at a shortest distance with respect to the first opposed portion is the first wide face, and the second terminal proximity portion positioned at a shortest distance with respect to the second opposed portion is the second wide face.

5. The connector assembly according to claim 2, wherein a minimum value of a distance between the second terminal proximity portion and the second opposed portion on the second axis is less than or equal to a maximum value of a terminal width of an axis orthogonal to the first axis on the second wide face of the second terminal proximity portion.

6. The connector assembly according to claim 1, wherein the first shield includes a contact portion that extends on a third axis intersecting both the first axis and the second axis and is in contact with the second shield, and each of the first ground connection portion and the second ground connection portion is formed along the third axis.

7. The connector assembly according to claim 6, wherein a dimension of the third axis of the contact portion is greater than a dimension of the third axis of the first terminal proximity portion projected on the virtual plane.

8. The connector assembly according to claim 1, wherein the first shield includes a first outer shield surrounding the plurality of first terminals, and a first inner shield disposed between two of the plurality of first terminals, and the first outer shield includes the first opposed portion.

9. The connector assembly according to claim 8, wherein the second shield includes a second outer shield surrounding the plurality of second terminals, and a second inner shield disposed between two of the plurality of second terminals, one of the first inner shield and the second inner shield has a second opposed portion opposed to the second specific terminal on the second axis in the fitted state, and the second specific terminal includes a second terminal proximity portion in which a distance to the second opposed portion on the second axis is smaller than a distance between the first specific terminal and the second opposed portion on the second axis in the fitted state.

10. The connector assembly according to claim 9, wherein the first inner shield includes the second opposed portion, the second inner shield has a third opposed portion opposed to the second specific terminal on the second axis and in contact with the second opposed portion in the fitted state, and the third opposed portion is on a same side as the second opposed portion with respect to the second specific terminal on the second axis in the fitted state.

11. The connector assembly according to claim 9, wherein, in the fitted state, an end face along a thickness axis of the first inner shield and an end face along a thickness axis of the second inner shield are in contact with each other.

12. The connector assembly according to claim 1, wherein the first specific terminal includes a first board-connected portion connected to a conductor pattern of the first circuit board, and a first contact portion provided with a contact in contact with the second specific terminal, the second specific terminal includes a second board-connected portion connected to a conductor pattern of the second circuit board, and a second contact portion provided with a contact in contact with the first specific terminal, one of the first board-connected portion and the second board-connected portion has an end face along a thickness axis overlapping a corresponding circuit board, and another of the first board-connected portion and the second board-connected portion has a face intersecting the thickness axis and overlapping a corresponding circuit board.

13. The connector assembly according to claim 12, wherein, in the fitted state, the first board-connected portion is positioned above the first contact portion on the first axis, and the second board-connected portion is positioned below the first contact portion on the first axis.

14. The connector assembly according to claim 1, wherein the first shield includes a first outer shield surrounding the plurality of first terminals, the first opposed portion is provided on the first outer shield, and a minimum value of a distance between the first terminal proximity portion and the first opposed portion on the second axis is less than or equal to a maximum value of a terminal width of an axis orthogonal to the first axis on the first wide face of the first terminal proximity portion.

* * * * *